US012621056B2

(12) United States Patent (10) Patent No.: US 12,621,056 B2
Zhang et al. (45) Date of Patent: May 5, 2026

(54) OPTICAL MODULE

(71) Applicant: HISENSE BROADBAND MULTIMEDIA TECHNOLOGIES CO., LTD., Shandong (CN)

(72) Inventors: Honghao Zhang, Qingdao (CN); Fei Liu, Qingdao (CN); Wei Cui, Qingdao (CN)

(73) Assignee: HISENSE BROADBAND MULTIMEDIA TECHNOLOGIES CO., LTD., Qingdao (CN)

( * ) Notice: Subject to any disclaimer, the term of this patent is extended or adjusted under 35 U.S.C. 154(b) by 313 days.

(21) Appl. No.: 18/399,670

(22) Filed: Dec. 28, 2023

(65) Prior Publication Data

US 2024/0146417 A1 May 2, 2024

Related U.S. Application Data

(63) Continuation of application No. PCT/CN2022/141868, filed on Dec. 26, 2022.

(30) Foreign Application Priority Data

Sep. 29, 2022 (CN) .......................... 202211203799.5

(51) Int. Cl.
  *H04B 10/40* (2013.01)
  *H04B 10/50* (2013.01)
  *H04B 10/61* (2013.01)
(52) U.S. Cl.
  CPC ........... *H04B 10/40* (2013.01); *H04B 10/503* (2013.01); *H04B 10/506* (2013.01); *H04B 10/615* (2013.01)
(58) Field of Classification Search
  None
  See application file for complete search history.

(56) References Cited

U.S. PATENT DOCUMENTS 11,677,478 B2 *  6/2023  Nagarajan ............ H04B 10/506
                                                           398/68
11,803,021 B2 * 10/2023  Wall, Jr. ................. G02B 6/426
         (Continued)

FOREIGN PATENT DOCUMENTS

CN          110531472 A      12/2019
CN          111722331 A       9/2020
         (Continued)

OTHER PUBLICATIONS

International Search Report of the ISA issued in PCT/CN2022/141868, mailed Jun. 21, 2023; ISA/CN.
         (Continued)

*Primary Examiner* — Jai M Lee
(74) *Attorney, Agent, or Firm* — Harness, Dickey & Pierce, P.L.C.

(57) ABSTRACT

Provided is an optical module including a circuit board and an optical transceiver device. The circuit board is provided with a mounting hole and a data processor. The optical transceiver device is mounted on the circuit board and is electrically connected to the data processor. The optical transceiver device includes a mounting shell, a first cover member, a light emission component and a light reception component. The first cover member is disposed on the front surface of the circuit board. A laser assembly and a translation prism assembly of the light emission component are located on the mounting shell and are exposed to the front surface of the circuit board through the mounting hole, and a light exiting direction of a light processing assembly of the light emission component forms a first preset angle with a light entering direction thereof in a plane parallel to the circuit board.

20 Claims, 17 Drawing Sheets

(56)  References Cited

U.S. PATENT DOCUMENTS

| 12,405,433 B2 * | 9/2025 | Winzer | ................. | G02B 6/428 |
| 2018/0254831 A1 * | 9/2018 | Ishii | ..................... | H05K 1/0274 |
| 2019/0281691 A1 * | 9/2019 | Matsui | ................. | H05K 1/0203 |
| 2019/0391348 A1 * | 12/2019 | Osenbach | ............ | G02B 6/4246 |
| 2020/0292769 A1 * | 9/2020 | Zbinden | ................. | H04B 10/25 |
| 2021/0175973 A1 * | 6/2021 | Liang | ........................ | H01S 5/12 |
| 2021/0239924 A1 * | 8/2021 | Mizuno | ............... | G02B 6/4221 |

FOREIGN PATENT DOCUMENTS

| CN | 214795314 U | 11/2021 |
| CN | 215678864 U | 1/2022 |
| CN | 114624829 A | 6/2022 |
| CN | 216772051 U | 6/2022 |
| WO | 2022166350 A1 | 8/2022 |

OTHER PUBLICATIONS

Written Opinion of the ISA issued in PCT/CN2022/141868, mailed Jun. 21, 2023; ISA/CN.

* cited by examiner

OPTICAL MODULE

CROSS-REFERENCE TO RELATED APPLICATIONS

This application is a continuation application of PCT/CN2022/141868 which claims priority to Chinese patent application No. 202211203799.5, filed on Sep. 29, 2022, the entire disclosure of which are incorporated herein by reference.

FIELD OF THE INVENTION

The present disclosure relates to the technical field of optical communication, and in particular, to an optical module.

BACKGROUND OF THE INVENTION

With developments of new businesses and applications such as cloud computing, mobile Internet, and video, development and progress of optical communication technologies have become increasingly important. Moreover, in the optical communication technology, optical module is a tool for mutual conversion between an optical signal and an electrical signal, and is one of key components in an optical communication device. Moreover, with the development of the optical communication technology, it is desired that transmission rate of the optical module is increased continuously.

SUMMARY OF THE INVENTION

According to an exemplary embodiment of the present disclosure, an optical module is provided, which includes: a circuit board provided, on a front surface thereof, with a data processor and with a mounting hole; and an optical transceiver device mounted on the circuit board adjacent to the mounting hole and is configured to be electrically connected to the data processor. The optical transceiver device includes: a first cover member mounted on the front surface of the circuit board; a mounting shell configured to be mounted, with a top surface thereof, on a back surface of the circuit board, a bottom surface of the mounting shell being provided with an accommodation cavity; a light emission component comprising a laser assembly, a translation prism assembly, and a light processing assembly, wherein the laser assembly and the translation prism assembly are located on the mounting shell and are exposed to the front surface of the circuit board through the mounting hole; emission light emitted from the laser assembly can be incident into the light processing assembly disposed on the first cover member after being reflected by the translation prism assembly; and the light processing assembly is connected to a fiber adapter via a fiber pigtail, and is configured such that a light exiting direction thereof forms a first preset angle with a light entering direction thereof within a plane parallel to the circuit board; and a light reception component that is disposed within the accommodation cavity of the mounting shell and is connected to the fiber adapter via another fiber pigtail.

According to another exemplary embodiment of the present disclosure, an optical module is provided, including: a circuit board provided, on a front surface thereof, with a first data processor and a second data processor, and with a mounting hole between the first data processor and the second data processor; a first optical transceiver device connected to an end of the circuit board in a plug-in manner and is configured to be electrically connected to the first data processor; and a second optical transceiver device mounted on the circuit board adjacent to the mounting hole and configured to be electrically connected to the second data processor. The second optical transceiver device includes: a first cover member mounted on the front surface of the circuit board; a mounting shell configured to be mounted, with a top surface thereof, on a back surface of the circuit board, a bottom surface of the mounting shell being provided with an accommodation cavity; a light emission component comprising a laser assembly, a translation prism assembly, and a light processing assembly, wherein the laser assembly and the translation prism assembly are located on the mounting shell and are exposed to the front surface of the circuit board through the mounting hole; emission light emitted from the laser assembly can be incident into the light processing assembly disposed on the first cover member after being reflected by the translation prism assembly; and the light processing assembly is connected to a fiber adapter via a fiber pigtail, and is configured such that a light exiting direction thereof forms a first preset angle with a light entering direction thereof within a plane parallel to the circuit board; and a light reception component that is disposed within the accommodation cavity of the mounting shell and is connected to the fiber adapter via another fiber pigtail.

BRIEF DESCRIPTION OF THE DRAWINGS

To illustrate the technical schemes of the present disclosure more clearly, drawings required for some embodiments of the present disclosure will be described briefly below. Apparently, these drawings as described below are merely drawings of some embodiments of the present disclosure, and other drawings may also be obtained by one of ordinary skills in the art from these drawings.

DETAILED DESCRIPTION OF THE EMBODIMENTS

Figure 1:
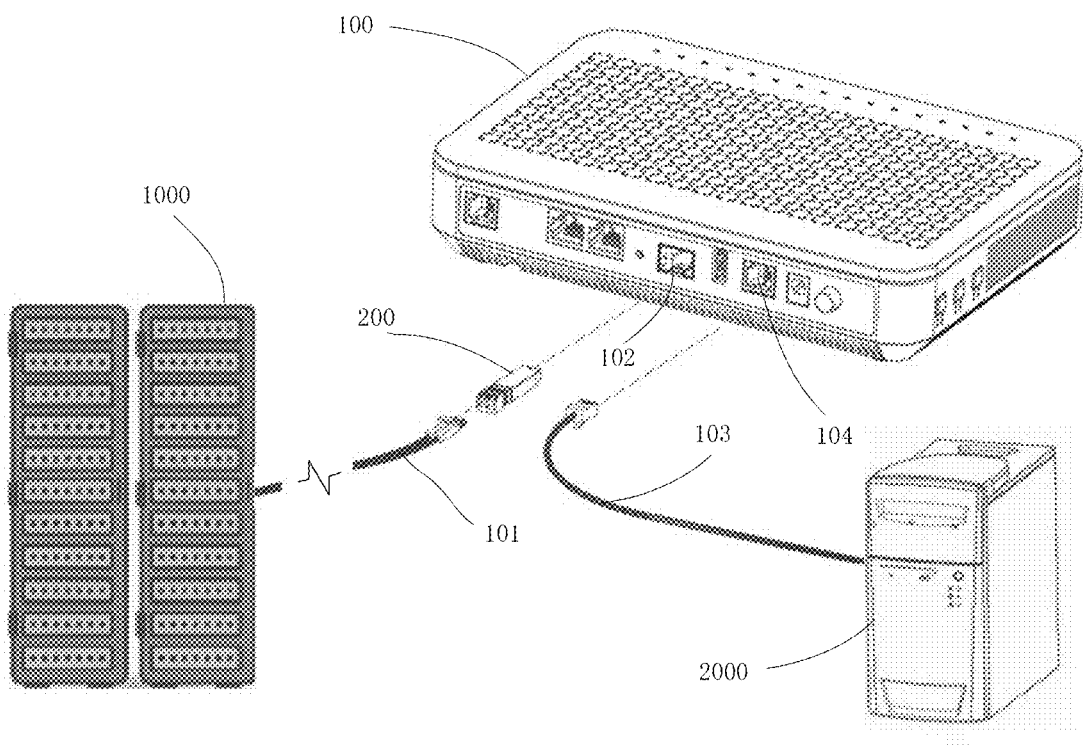
FIG. 1 is a schematic diagram illustrating a connection relationship of an optical communication system in accordance with an exemplary embodiment.

Some embodiments of the present disclosure will be described below with reference to the drawings. However, these embodiments are merely some, and not all, of embodiments of the present disclosure. According to the embodiments provided in the present disclosure, all other embodiments derived by one of ordinary skills in the art fall within the protection scope of the present disclosure.

Unless otherwise explicitly stated in the context, in the present disclosure, the term "include" is intended to be inclusive, meaning "including, but not limited to"; the terms "first", "second", and the like are not intended to indicate or imply relative importance or indicate an upper limit on quantity; the term "several" means two or more than two; the term "connect" should be broadly understood, for example, it may be a fixed connection, a detachable connection, or an integrated connection, or it may be a direct connection, or an indirect connection through an intermediate medium; use of the term "applicable to" or "configured to" implies open and inclusive languages, which does not exclude devices that are applicable or configured to perform additional tasks or steps; the terms "parallel", "vertical", "identical", "consistent", "flush", and other descriptions are not limited to absolute mathematical theoretical relationships, but also include acceptable error ranges generated in practice, and also include differences that are based on the same design concepts but are caused due to manufacturing reasons.

In optical communication technology, in order to establish information transmission between information processing devices, it needs to load information onto light such that the information is transmitted through propagation of the light in an information transmission device. Herein, a light loaded with information is an optical signal. The information processing devices typically include an optical network unit, an optical line terminal, a gateway, a router, a switch, a server and the like. The information transmission device typically includes an optical fiber and an optical waveguide.

Signals that can be recognized and processed by an information processing device are electrical signals. An optical module is generally used to achieve mutual conversion of an optical signal and an electrical signal between the information processing device and the information transmission device. An information processing device directly connected to the optical module is referred to as a host computer of the optical module, which establishes a one-way or a two-way electrical signal connection with the optical module.

A first optical signal from a remote information processing device may be transmitted to the optical module through the optical fiber. The optical module converts the first optical signal into a first electrical signal, and transmits the first electrical signal to the host computer. A second electrical signal from the host computer is transmitted to the optical module. The optical module converts the second electrical signal into a second optical signal, and transmits the second optical signal to the optical fiber. The second optical signal is transmitted to the remote information processing device through the optical fiber. During the foregoing conversion process between the optical signal and the electrical signal, the information keeps unchanged, but encoding and decoding manners of the information may be varied.

FIG. 1 is a schematic diagram illustrating a connection relationship of an optical communication system in accordance with an exemplary embodiment. As shown in FIG. 1, an optical communication system may include a remote server 1000, a local information processing device 2000, an optical network terminal 100, an optical module 200, an optical fiber 101, and a network cable 103.

One end of the optical fiber 101 may be connected to the remote server 1000, and the other end of the optical fiber may be connected to the optical network terminal 100 through the optical module 200.

The network cable 103 may be connected, at one end thereof, to the local information processing device 2000, and, at the other end thereof, to the optical network terminal 100. The local information processing device 2000 may be a router, a switch, a computer, a mobile phone, a tablet, or a television and the like.

Typically, the optical module 200 may include an optical port and an electrical port. The optical port is configured to receive the optical fiber 101, such that a bidirectional optical signal connection is established between the optical module 200 and the optical fiber 101. The electrical port is configured to receive the optical network terminal 100, such that a bidirectional electrical signal connection is established between the optical module 200 and the optical network terminal 100. In this way, an information connection is established between the optical fiber 101 and the optical network terminal 100. For example, an optical signal from the optical fiber 101 may be converted into an electrical signal by the optical module 200, and then be transmitted into the optical network terminal 100, and an electrical signal from the optical network terminal 100 may be converted into an optical signal by the optical module 200, and then be transmitted into the optical fiber 101.

The optical network terminal 100 may include an optical module interface 102 and a network cable interface 104. The optical module interface 102 is configured to couple the optical module 200, and the network cable interface 104 is configured to couple the network cable 103. For example, the optical network terminal 100 may transmit an electrical signal from the optical module 200 to the network cable 103, and transmit an electrical signal from the network cable 103 to the optical module 200. Therefore, as a host computer of the optical module 200, the optical network terminal 100 may monitor operation of the optical module 200. In addition to the optical network terminals 100, the host computer of the optical module 200 may also be an optical line terminal (OLT).

Therefore, the remote server 1000 may establish a two-way signal transmission channel with the local information processing device 2000 through the optical fiber 101, the optical module 200, the optical network terminal 100, and the network cable 103.

Figure 2:
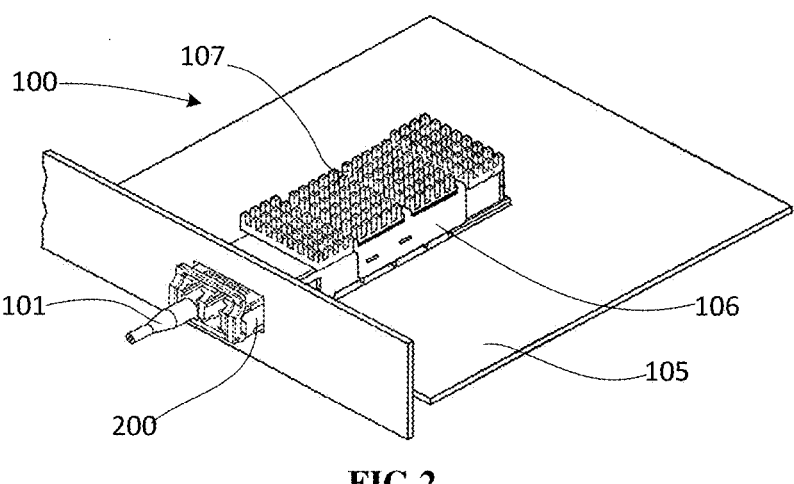
FIG. 2 is a schematic diagram illustrating a partial structure of an optical network terminal in accordance with an exemplary embodiment.

FIG. 2 is a schematic diagram illustrating a partial structure of an optical network terminal in accordance with an exemplary embodiment. To clearly illustrate a connection relationship between the optical module 200 and the optical network terminal 100, FIG. 2 only depicts a partial structure of the optical network terminal 100 in relation with the optical module 200. As shown in FIG. 2, the optical network terminal 100 may include a circuit board 105 disposed inside a shell, a cage 106 disposed on a surface of the circuit board 105, and a radiator 107 disposed on the cage 106.

The optical module 200 may be inserted into the cage 106 of the optical network terminal 100 and is fixedly connected with the cage 106. Heat generated by the optical module 200 may be conducted to the cage 106, and then be diffused through the radiator 107. After the optical module 200 is inserted into the cage 106, the electrical port of the optical module 200 is connected to an electrical connector in the cage 106, such that a bidirectional electrical signal connection is established between the optical module 200 and the optical network terminal 100.

Figure 3:
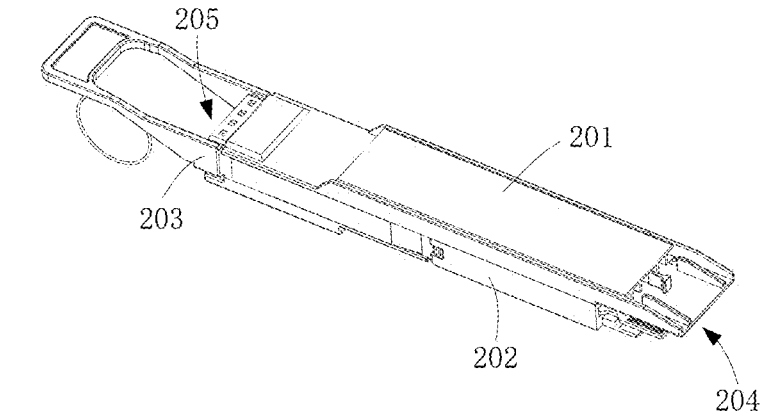
FIG. 3 is a schematic diagram illustrating a structure of an optical module in accordance with an exemplary embodiment of the present disclosure.
Figure 4:
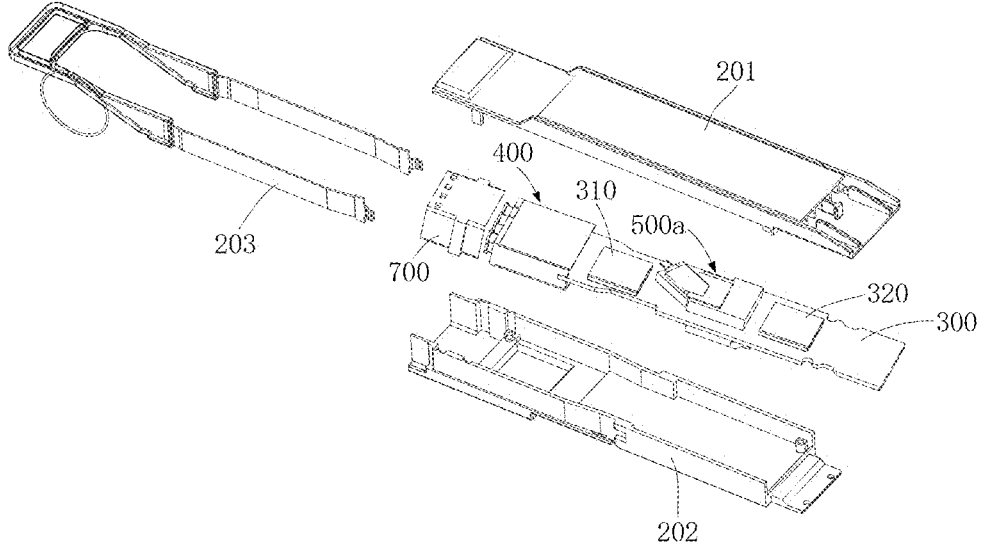
FIG. 4 is an exploded schematic diagram of an optical module in accordance with an exemplary embodiment of the present disclosure.

FIG. 3 is a structural schematic diagram of an optical module in accordance with an exemplary embodiment of the present disclosure. FIG. 4 is an exploded schematic diagram of an optical module in accordance with an exemplary embodiment of the present disclosure. As shown in FIG. 3 and FIG. 4, the optical module 200 may include a shell, and a circuit board 300, a first optical transceiver device 400, and a second optical transceiver device 500a that are disposed inside the shell.

The shell may include an upper shell 201 and a lower shell 202. The upper shell 201 is covered above the lower shell 202 to form a mounting cavity with two openings 204 and 205. The circuit board 300 is disposed in the mounting cavity. An outer contour of the shell is generally in a square shape.

A direction of a connection line between the two openings 204 and 205 may be consistent or inconsistent with a length direction of the optical module 200. For example, the opening 204 may be at an end portion (a right end in FIG. 3) of the optical module 200, and the opening 205 may also be at an end portion (a left end in FIG. 3) of the optical module 200. Alternatively, the opening 204 may be located at an end portion of the optical module 200, while the opening 205 is located at a side portion of the optical module 200. The opening 204 may be an electrical port from which a golden finger of the circuit board 300 may be extended to be inserted into the host computer (for example, the optical network terminal 100). The opening 205 may be an optical port that is configured to couple the external optical fiber 101, such that the optical fiber 101 is connected to the optical transceiver device inside the optical module 200.

With an assembly manner of combining the upper shell 201 and the lower shell 202 components inside the shell may be packaged and protected. In some embodiments, the upper shell 201 and the lower shell 202 are made of metal materials, which facilitate to achieve an electromagnetic shielding function and a heat dissipation function.

In some embodiments, as shown in FIG. 3 and FIG. 4, the optical module 200 may also include an unlocking component 203 outside the shell of the optical module 200. The unlocking component 203 is configured to achieve or remove a fixedly connection between the optical module 200 and the host computer.

The circuit board 300 may be provided with circuit wirings, electronic elements, and a chip. The electronic elements are connected to the chip according to a circuit design through the circuit wirings, to implement functions such as supplying power, transmitting an electrical signal, and grounding. The electronic elements may be, for example, a capacitor, a resistor, a transistor, or a metal-oxide semiconductor field-effect transistor. The chip may be, for example, a micro control unit, a laser driver chip, a trans-impedance amplifier, a limiting amplifier, a clock data recovery chip, or a digital signal processing (DSP) chip. The circuit board 300 is generally a hard circuit board, which may also implement a load-bearing function due to its relatively hard material. The circuit board 300 further includes a golden finger formed on a surface at an end portion thereof. The golden finger is composed of a plurality of independent pins. The circuit board 300 may be inserted into the host computer to be communicated and connected with an electrical connector in the host computer through the golden finger. The golden finger may be disposed only on a surface of one side of the circuit board 300 (such as a front surface shown in FIG. 4); or may be disposed on surfaces of upper and lower sides of the circuit board 300 to provide a larger quantity of pins, thereby adapting to a situation that requires a large quantity of pins. The golden finger is configured to establish an electrical connection with the host computer, to implement power supply, grounding, inter-integrated circuit (I2C) signal transmission, data signal transmission, and the like. Certainly, some optical modules may also use flexible circuit boards. The flexible circuit board is generally used in cooperation with the hard circuit board, to serve as a supplement to the hard circuit board.

Figure 5:
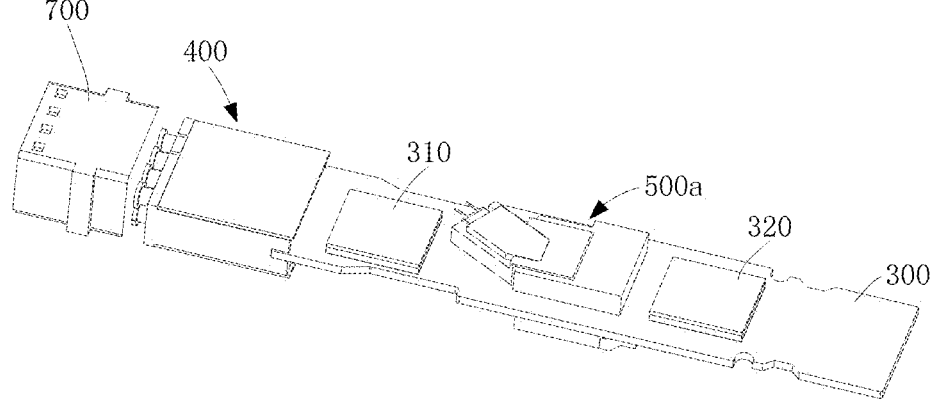
FIG. 5 is a first assembly schematic diagram of a circuit board, a first optical transceiver device, and a second optical transceiver device of an optical module in accordance with an exemplary embodiment of the present disclosure.
Figure 6:
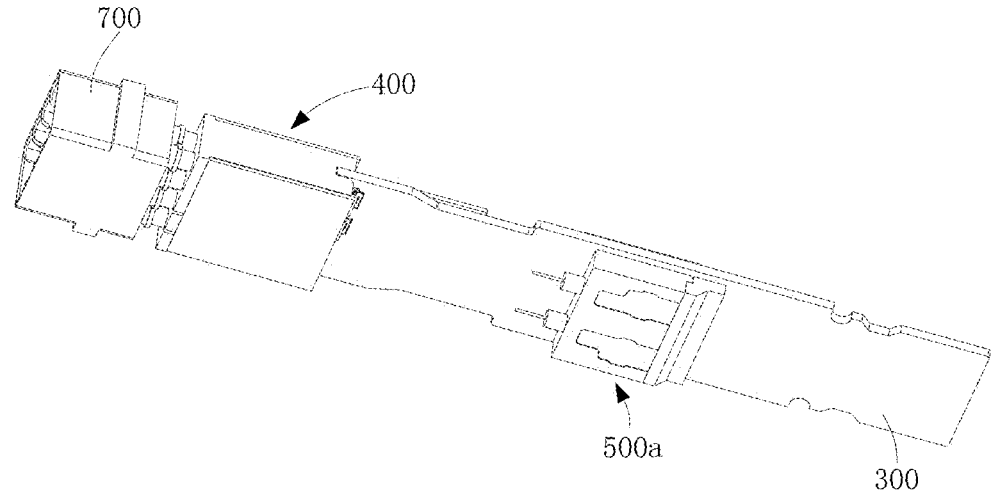
FIG. 6 is a second assembly schematic diagram of a circuit board, a first optical transceiver device, and a second optical transceiver device of an optical module in accordance with an exemplary embodiment of the present disclosure.

FIG. 5 is one assembly schematic diagram of a circuit board, a first optical transceiver device, and a second optical transceiver device in an optical module in accordance with an exemplary embodiment. FIG. 6 is another assembly schematic diagram of a circuit board, a first optical trans-ceiver device, and a second optical transceiver device in an optical module in accordance with an exemplary embodi-ment. As shown in FIG. 5 and FIG. 6, an optical module according to an exemplary embodiment may include a first optical transceiver device 400 and a second optical trans-ceiver device 500a. The first optical transceiver device 400 may be disposed at an end portion of the circuit board 300 and may be connected to a fiber adapter 700 in a plug-in manner, to implement an 8-channel light emission and an 8-channel light reception. The second optical transceiver device 500a may be disposed on the circuit board 300 and may be connected to the fiber adapter 700 in a pigtail connection manner. A light emission portion (which is also referred to as a light emission component) of the second optical transceiver device 500a is substantially located on a front surface of the circuit board 300, to implement an 8-channel light emission. A light reception portion (which is also referred to as a light reception component) of the second optical transceiver device 500a is located on a back surface of the circuit board 300, to implement an 8-channel light reception.

A 100G data transmission of 16 channels is implemented through the 8-channel light emission of the first optical transceiver device 400 and the 8-channel light emission of the second optical transceiver device 500a. A 100G data transmission of 16 channels is achieved through the 8-chan-nel light reception of the first optical transceiver device 400 and the 8-channel light reception of the second optical transceiver device 500a.

Figure 7:
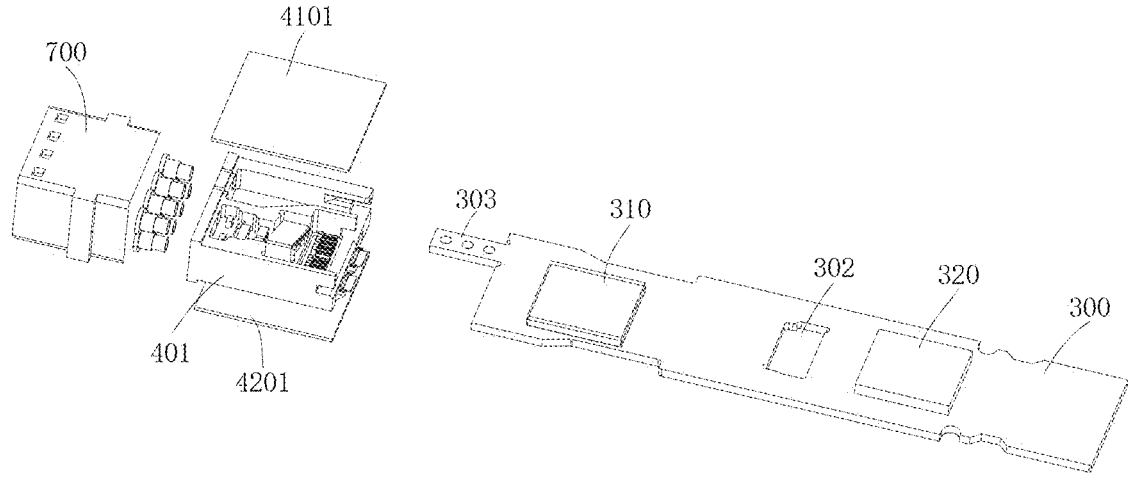
FIG. 7 is a partial exploded schematic diagram of a circuit board and a first optical transceiver device of an optical module in accordance with an exemplary embodiment of the present disclosure.
Figure 8:
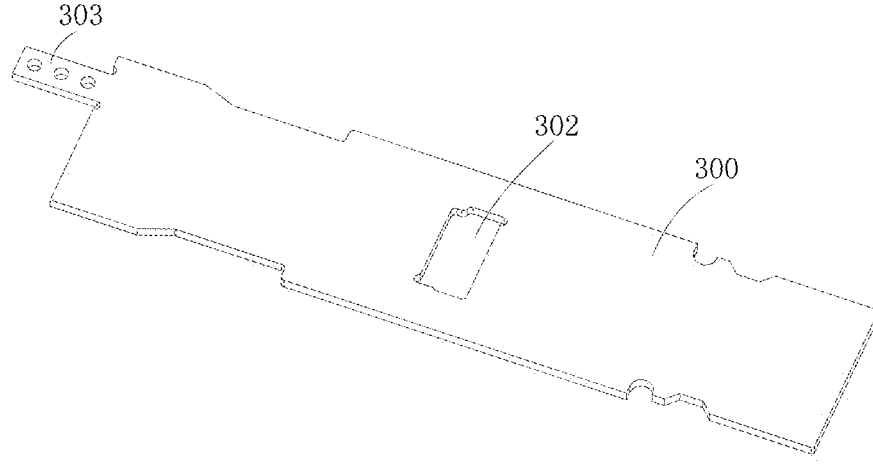
FIG. 8 is a schematic diagram illustrating a structure of a circuit board of an optical module in accordance with an exemplary embodiment of the present disclosure.

FIG. 7 is a partial exploded schematic diagram of a circuit board and a first optical transceiver device in an optical module in accordance with an exemplary embodiment. FIG. 8 is a schematic diagram illustrating a structure of a circuit board in an optical module in accordance with an exemplary embodiment. As shown in FIG. 7 and FIG. 8, the circuit board 300 is provided, on the front surface thereof, with a first DSP chip 310 and a second DSP chip 320, which are connected to the golden finger via signal lines, respectively. The first DSP chip 310 and the second DSP chip 320 may be disposed on the front surface of the circuit board 300 in a left-right direction, with the first DSP chip 310 being arranged close to the fiber adapter 700, and the second DSP chip 320 being located on a right side of the first DSP chip 310.

In some embodiments, the first DSP chip 310 and the second DSP chip 320 may be located on the same side of the circuit board 300. For example, the first DSP chip 310 and the second DSP chip 320 are both located on the front surface or the back surface of the circuit board 300. Alter-natively, the first DSP chip 310 and the second DSP chip 320 may be located on different sides of the circuit board 300. For example, the first DSP chip 310 is located on the front surface or the back surface of the circuit board 300, while the second DSP chip 320 is located on the back surface or the front surface of the circuit board 300.

For example, from the perspective of facilitating heat dissipation, the first DSP chip 310 and the second DSP chip 320 may both be located on the front surface of the circuit board 300.

An end of the circuit board 300 that is opposite to the end provided with the golden finger may be provided with a protrusion plate 303. As shown in FIG. 7, the protrusion plate 303 may be formed by extending a left end surface of the circuit board 300 towards the fiber adapter 700. There is a preset distance between each side of the protrusion plate 303 and the corresponding side of the circuit board 300, such that a left side of the circuit board 300 is T-shaped.

The protrusion plate 303 of the circuit board 300 may be inserted into the first optical transceiver device 400 such that a light emission component of the first optical transceiver device 400 is disposed opposite to the left end surface of the circuit board 300. The light reception component in the first optical transceiver device 400 is located on the back surface of the circuit board 300. In this way, the front surface of the circuit board 300 may align with the light emission component, and the back surface of the circuit board 300 may align with the light reception component, thereby facilitating electrically connection of the first DSP chip 310 and the first optical transceiver device 400.

In some embodiments, the circuit board 300 is provided with a mounting hole 302 that penetrates through the circuit board 300. The second optical transceiver device 500a is disposed on the front surface and the back surface of the circuit board 300 through the mounting hole 302. Moreover, the second DSP chip 320 is electrically connected to the second optical transceiver device 500a through a signal line, so as to drive the light emission component of the second optical transceiver device 500a to emit signal light, and to cause an optical signal transmitted from the light reception component of the second optical transceiver device 500a to be forwarded to the second DSP chip 320.

Figure 9:
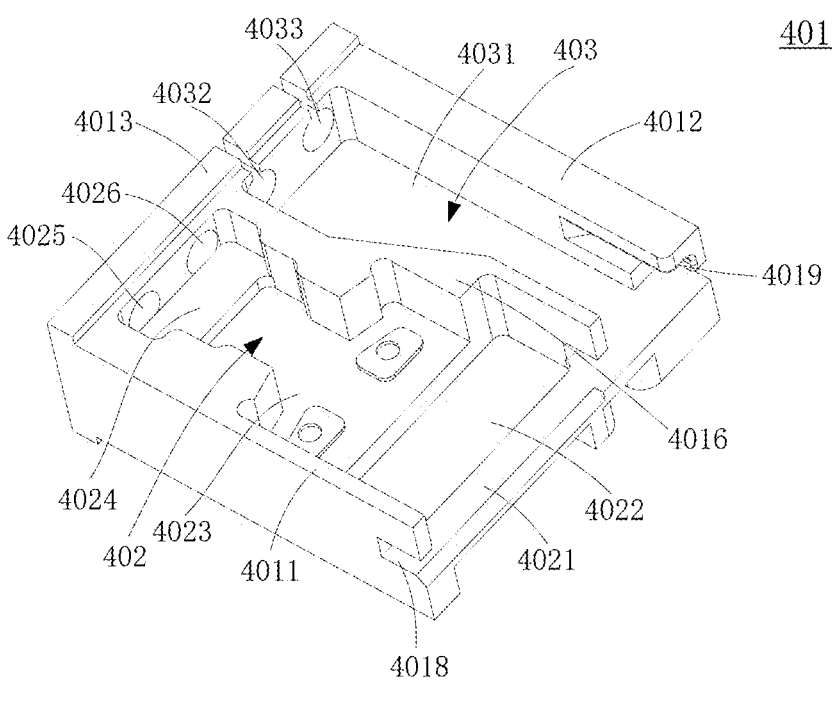
FIG. 9 is a first schematic diagram illustrating a structure of a first mounting shell of a first optical transceiver device of an optical module in accordance with an exemplary embodiment of the present disclosure.
Figure 10:
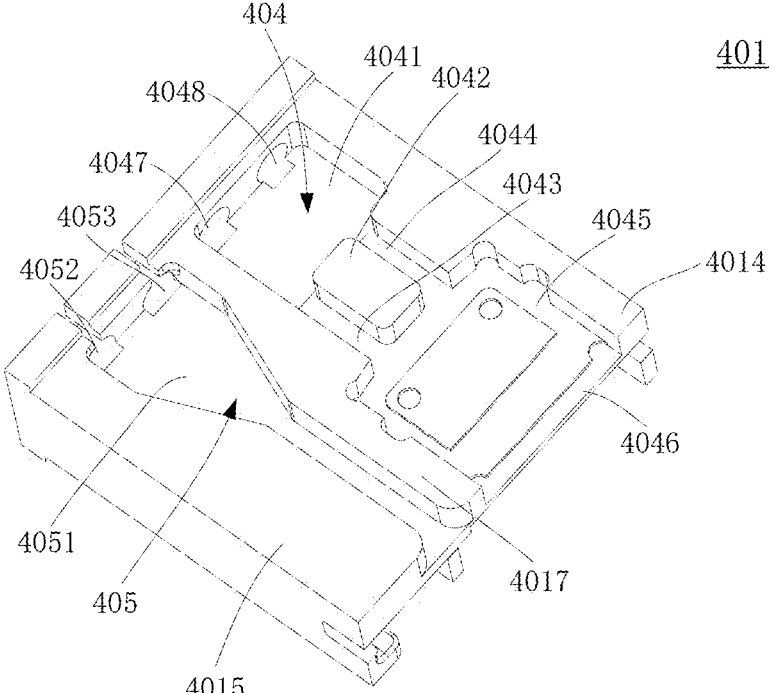
FIG. 10 is a second schematic diagram illustrating a structure of a first mounting shell of a first optical transceiver device of an optical module in accordance with an exemplary embodiment of the present disclosure.

FIG. 9 is a first structural schematic diagram of a first mounting shell of a first optical transceiver device (the mounting shell of the first optical transceiver device 400 is referred to as a first mounting shell hereinafter, for ease of description) of an optical module in accordance with an exemplary embodiment. FIG. 10 is a second structural schematic diagram of a first mounting shell of a first optical transceiver device of an optical module in accordance with an exemplary embodiment. As shown in FIG. 9 and FIG. 10, the first optical transceiver device 400 may include a first mounting shell 401, which may include a first cavity 402, a second cavity 403, a third cavity 404, and a fourth cavity 405. In a state where the first optical transceiver device 400 and the circuit board are mounted together, the first cavity 402 and the second cavity 403 may be above the front surface of the circuit board 300, and the third cavity 404 and the fourth cavity 405 may be below the back surface of the circuit board 300. The first cavity 402 is arranged opposite to the third cavity 404, and the second cavity 403 is arranged opposite to the fourth cavity 405. Moreover, the first cavity 402 is separated from the third cavity 404 by a partition plate, and the second cavity 403 is separated from the fourth cavity 405 by a partition plate.

In some embodiments, the first activity 402 may be stacked with the third activity 404 up and down. An end of the first cavity 402 may be provided with a notch 4018 through which the circuit board 300 may be inserted into the first mounting shell 401. The second cavity 403 may be stacked with the fourth cavity 405 up and down, and the second cavity 403 and the fourth cavity 405 may be opposite to the protrusion plate 303, and the protrusion plate 303 is inserted into the second cavity 403.

Reference may also be made to FIG. 7. The first optical transceiver device 400 may also include a first cover plate 4101, which may be covered above the first cavity 402 and the second cavity 403. The first cavity 402 may contain a light emission component including a laser, a lens, and the like. The first cover plate 4101 may form a sealed cavity with the first cavity 402. The light emission component including the laser, the lens, and the like may be accommodated within the sealed cavity.

The first optical transceiver device 400 may also include a second cover plate 4201, which may be covered above the third cavity 404 and the fourth cavity 405. The third cavity 404 may contain a light reception component including a lens, a reflecting prism, and the like. The second cover plate 4201 may form a sealed cavity with the third cavity 404. The light reception component including the laser, the lens, and the like may be accommodated within the sealed cavity.

In some embodiments, according to protocol requirements, an emission optical port is arranged on an upper layer, and a reception optical port is arranged on a lower layer. Therefore, the light emission component and the light reception component may be disposed back to back through the first cavity 402 and the third cavity 404, with the light emission component being arranged on the front surface of the circuit board 300, and the light reception component being arranged on the back surface of the circuit board 300.

The first mounting shell 401 may include a first side plate 4013, a second side plate 4011, a third side plate 4012, and a first partition plate 4016. The second side plate 4011 is arranged opposite to the third side plate 4012, and the first partition plate 4016 is arranged between the second side plate 4011 and the third side plate 4012. The second side plate 4011, the third side plate 4012 and the first partition plate 4016 are connected to the first side plate 4013, respectively. Moreover, the first cavity 402 is formed by the first side plate 4013, the second side plate 4011 and the first partition plate 4016, and the second cavity 403 is formed by the first side plate 4013, the third side plate 4012, and the first partition plate 4016.

In some embodiments, as depicted in FIG. 9, the first side plate 4013 may be located at a left side of the first mounting shell 401, the second side plate 4011 may be located at a rear side of the first mounting shell 401, and the third side plate 4012 may be located at a front side of the first mounting shell 401. Right sides of the first cavity 402 and the second cavity 403 are opened such that the first cavity 402 and the second cavity 403 similarly have U-shaped cavities, with openings at the right sides.

In a left-right direction, a width of the first cavity 402 in a front-rear direction (that is, a distance between the second side plate 4011 and the first partition plate 4016) gradually increases, while a width of the second cavity 403 in the front-rear direction (i.e., a distance between the third side plate 4012 and the first partition plate 4016) gradually decreases. In other words, a width of the first cavity 402 at the right side is greater than that at the left side, and a width of the second cavity 403 at the right side is smaller than that at the left side.

The first cavity 402 may have a first mounting surface 4021, a second mounting surface 4022, a third mounting surface 4023, and a fourth mounting surface 4024. The first mounting surface 4021 may face towards the circuit board 300. The second mounting surface 4022 is connected to the first mounting surface 4021. The fourth mounting surface 4024 is adjacent to the first side plate 4013. The third mounting surface 4023 is connected to the second mounting surface 4022 and the fourth mounting surface 4024, respectively. In some embodiments, a bottom surface of the notch 4018 in the first mounting shell 401 acts as the first mounting surface 4021.

In some embodiments, the second mounting surface 4022 is recessed relative to the first mounting surface 4021. The fourth mounting surface 4024 protrudes relative to the third mounting surface 4023. An end of the circuit board 300 is inserted into the first mounting shell 401 through the notch 4018, with the back surface of the circuit board 300 in contact with and connected with the first mounting surface 4021.

Figure 11:
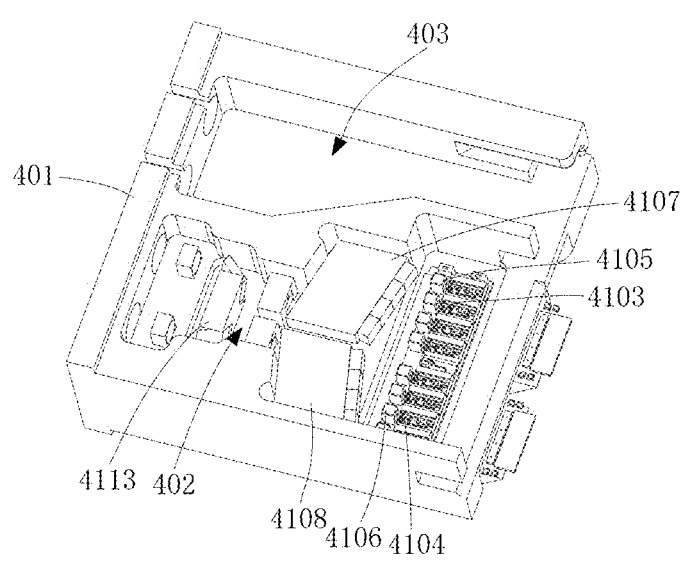
FIG. 11 is a first schematic diagram illustrating a structure of a first optical transceiver device of an optical module in accordance with an exemplary embodiment of the present disclosure.

FIG. 11 is a first structural schematic diagram of a first optical transceiver device in an optical module in accordance with an exemplary embodiment. As shown in FIG. 11, a first semiconductor cooler may be disposed on the second mounting surface 4022. A first laser group 4103 and a second laser group 4104 are provided on a cooling surface of the first semiconductor cooler side by side in a front-rear direction.

In some embodiments, the first laser group 4103 may include four lasers that are arranged side by side in the front-rear direction. The second laser group 4104 may include four lasers that are arranged side by side in the front-rear direction. In this case, eight lasers are disposed on the cooling surface of the first semiconductor cooler side by side in the front-rear direction.

In some embodiments, the first DSP chip 310 on the front surface of the circuit board 300 is an 8-channel DSP of 800G. In this way, each channel of the first DSP chip 310 can transmit an electrical signal at 100 Gb/s, which in turn can drive a laser with 100 Gb/s. In this way, each laser in the first cavity 402 is a laser with 100 Gb/s.

In some embodiments, lasers of the first laser group 4103 and the second laser group 4104 are connected to the first DSP chip 310 with signal lines. Signals of the first DSP chip 310 may be transmitted to the lasers through differential signal lines. To avoid interference from a differential signal, a distance between adjacent lasers is 1.1 mm.

With support of the first semiconductor cooler, wire bonding heights of the first laser group 4103 and the second laser group 4104 may be on the same plane as the front surface of the circuit board 300. In this way, the wire bonding distance from each of the first laser group 4103 and the second laser group 4104 to the front surface of the circuit board 300 is shortest, which can reduce losses.

In some embodiments, a first laser driver chip is provided on the front surface of the circuit board 300 between the first DSP chip 310 and the first optical transceiver device 400. The first DSP chip 310 transmits an electrical signal to the first laser driver chip through the signal line, and the first laser driver chip converts the electrical signal into a driving electrical signal. The driving electrical signal is transmitted to the first laser group 4103 and the second laser group 4104, to drive the first laser group 4103 and the second laser group 4104 to emit four paths of emission light, respectively.

A first collimating lens group 4105 and a second collimating lens group 4106 may also be provided on the cooling surface of the first semiconductor cooler. The first collimating lens group 4105 is arranged along a light exiting direction of the first laser group 4103, and the second collimating lens group 4106 is arranged along a light exiting direction of the second laser group 4104. The collimating lenses are aligned to the lasers in one-to-one correspondence such that emission light emitted from each laser is converted into collimated light by a corresponding collimating lens.

A first wavelength division multiplexer 4107 and a second wavelength division multiplexer 4108 are disposed on the third mounting surface 4023. The first wavelength division multiplexer 4107 has four inputs and one outputs, the four inputs are each aligned with one collimating lens of the first collimating lens group 4105. In this way, four paths of collimated lights output from the first collimating lens group 4105 are all incident into the first wavelength division multiplexer 4107, and are multiplexed into one path of composite light by the first wavelength division multiplexer 4107. This path of composite light is then emitted from the output of the first wavelength division multiplexer 4107. The second wavelength division multiplexer 4108 has four inputs and one output, the four inputs are each aligned with one collimating lens of the second collimating lens group 4106. In this way, four paths of collimated lights output from the second collimating lens group 4106 are all incident into the second wavelength division multiplexer 4108, and are multiplexed into one path of composite light by the second wavelength division multiplexer 4108, and this path of composite light is then emitted from the output of the second wavelength division multiplexer 4108.

Figure 14:
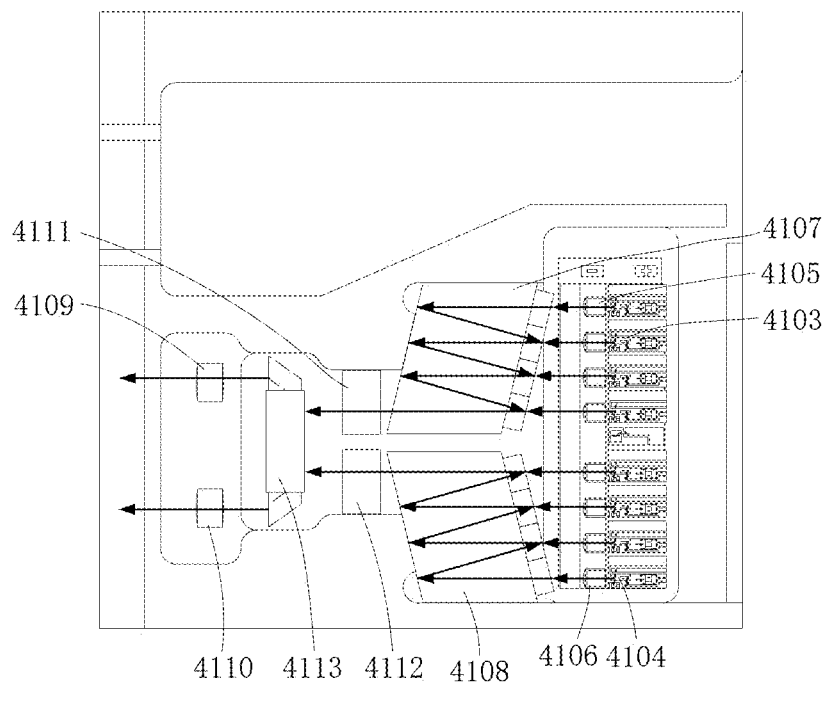
FIG. 14 is a schematic diagram illustrating an optical path in a light emission component of a first optical transceiver device in an optical module in accordance with an exemplary embodiment of the present disclosure.

As shown in FIG. 14, a first converging lens 4109 and a second converging lens 4110 may be disposed on the fourth mounting surface 4024. The first converging lens 4109 may be disposed corresponding to the output of the first wavelength division multiplexer 4107, so as to convert one path of composite light output from the first wavelength division multiplexer 4107 into converged light. The second converging lens 4110 may be aligned with the second wavelength division multiplexer 4108 so as to convert one path of composite light output from the second wavelength division multiplexer 4108 into converged light.

In some embodiments, a distance between first composite light output from the first wavelength division multiplexer 4107 and second composite light output from the second wavelength division multiplexer 4108 may be smaller than a distance between the first converging lens 4109 and the second converging lens 4110. In other words, a light outlet of the first wavelength division multiplexer 4107 is not on the same straight line as the first converging lens 4109, and a light outlet of the second wavelength division multiplexer 4108 is not on the same straight line as the second converging lens 4110.

In order that the first composite light output from the first wavelength division multiplexer 4107 may be incident into the first converging lens 4109, and the second composite light output from the second wavelength division multiplexer 4108 may be incident into the second converging lens 4110, a first prism assembly 4113 may also be provided on the third mounting surface 4023 between the first wavelength division multiplexer 4107 and the first converging lens 4109. The first prism assembly 4113 is configured to change a light transmission direction. The first composite light output from the first wavelength division multiplexer 4107 is reflected by the first prism assembly 4113 and then is incident to the first converging lens 4109. The second composite light output from the second wavelength division multiplexer 4108 is reflected by the first prism assembly 4113 and then is incident to the second converging lens 4110.

Figure 12:
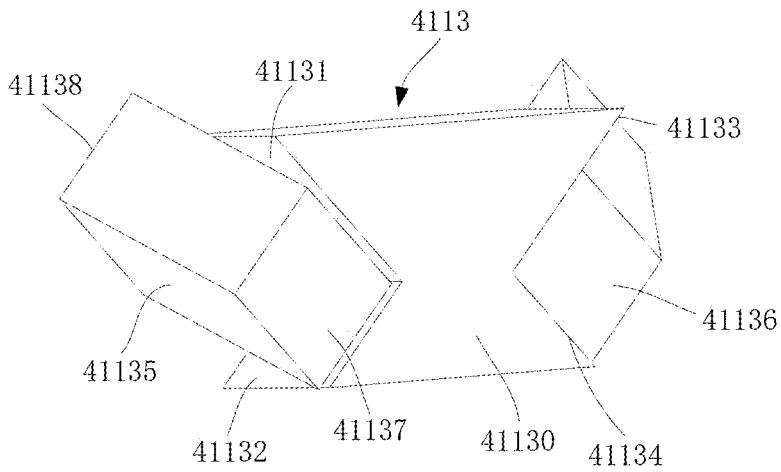
FIG. 12 is a structural schematic diagram of a first prism assembly in an optical module in accordance with an exemplary embodiment of the present disclosure.
Figure 13:
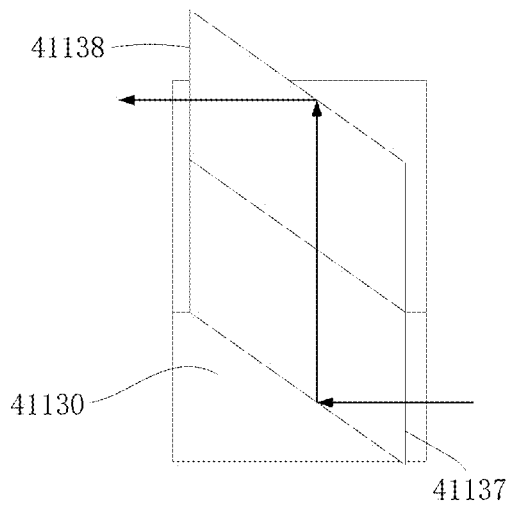
FIG. 13 is a schematic diagram illustrating an optical path of a first prism assembly in an optical module in accordance with an exemplary embodiment of the present disclosure.

FIG. 12 is a structural schematic diagram of a first prism assembly in an optical module in accordance with an exemplary embodiment. FIG. 13 is a schematic diagram illustrating an optical path of a first prism assembly in an optical module in accordance with an exemplary embodiment. As shown in FIG. 12 and FIG. 13, the first prism assembly 4113 may include a first support member 41130, a first prism 41135 and a second prism 41136. The opposite sides of the first support member 41130 respectively have a first fixing surface 41131, a second fixing surface 41132, a third fixing surface 41133, and a fourth fixing surface 41134. The first fixing surface 41131 is connected to the second fixing surface 41132 at a preset angle, and the third fixing surface 41133 is connected to the fourth fixing surface 41134 at a preset angle, such that a top portion and a bottom portion of the first support member 41130 are relatively wider, while a middle portion thereof is relatively narrower.

The first prism 41135 may have a first light entering surface 41137 and a first light exiting surface 41138 that are opposite to each other. There may be offset in a front-rear direction between the first light entering surface 41137 and the first light exiting surface 41138. A side surface of the first prism 41135 may be affixed onto the first fixing surface 41131 such that the first light entering surface 41137 faces towards the second wavelength division multiplexer 4108, and the first light exiting surface 41138 faces towards the fiber adapter 700. In this way, the second composite light output from the second wavelength division multiplexer 4108 can be incident to the first prism 41135 through the first light entering surface 41137, and then be emitted from the first light exiting surface 41138 after being reflected several times in the first prism 41135.

A structure of the second prism 41136 may be the same as that of the first prism 41135. A side surface of the second prism 41136 may be affixed onto the third fixing surface 41133 such that a light entering surface of the second prism 41136 faces towards the first wavelength division multiplexer 4107, and a light exiting surface of the second prism 41136 faces towards the fiber adapter 700. In this way, the first composite light output from the first wavelength division multiplexer 4107 may be incident to the second prism 41136 through the light entering surface, and then be emitted from the light exiting surface after being reflected several times in the second prism 41136.

In some embodiments, when a composite light is incident to the first prism assembly 4113, the composite light may be reflected at the light entering surface of the first prism assembly 4113 due to changes in a transmission medium. The reflected composite light may return to the laser along an original path, which would affect emission performance of the laser.

FIG. 14 is a schematic diagram illustrating an optical path in a light emission component of a first optical transceiver device in an optical module in accordance with an exemplary embodiment. As shown in FIG. 14, in order to prevent the light reflected at the light entering surface of the first prism assembly 4113 from returning to the laser along the original path, a first isolator 4111 and a second isolator 4112 may also be disposed on the third mounting surface 4023. The first isolator 4111 is arranged between the first wavelength division multiplexer 4107 and the first prism assembly 4113, and the second isolator 4112 is arranged between the second wavelength division multiplexer 4108 and the first prism assembly 4113. Light of the first composite light from the first wavelength division multiplexer that is reflected on the first prism assembly 4113 is isolated by the first isolator 4111. Light of the second composite light from the second wavelength division multiplexer that is reflected on the first prism assembly 4113 is isolated by the second isolator 4112.

As shown in FIG. 9, a first light outlet 4025 and a second light outlet 4026 may be provided in the first side plate 4013, which both communicate with the first cavity 402. In this way, the converged light emitted from the first converging lens 4109 may be incident to the fiber adapter 700 through the second light outlet 4026, and the converged light emitted from the second converging lens 4110 may be incident to the fiber adapter 700 through the first light outlet 4025, thereby achieving emission of two paths of composite light (eight paths of emission light).

In some embodiments, the first light outlet 4025 and the second light outlet 4026 may be in hard connections to the fiber adapter 700 through MDC optical ports, so as to achieve a hard connection and assembly between the first cavity 402 and the fiber adapter 700.

In some embodiments, the second cavity 403 may include a fifth mounting surface 4031, which extends in a direction from the first side plate 4013 to the circuit board 300. The fifth mounting surface 4031 is arranged side by side with the mounting surfaces of the first cavity 402. The protrusion plate 303 of the circuit board 300 is inserted into the second cavity 403, and a back surface of the protrusion plate 303 is in contact with and is connected to the fifth mounting surface 4031.

A third light outlet 4032 and a fourth light outlet 4033 may also be provided in the first side plate 4013, which both communicate with the second cavity 403.

In some embodiments, a holding slot 4019 with an opening at a right side thereof may be disposed on an inner side of the third side plate 4012. An opening is provided on a side of the holding slot 4019 that faces towards the first cavity 402. Optical fibers connected to the light emission components of the second optical transmission component 500a may pass through the second cavity 403, the third light outlet 4032 and the fourth light outlet 4033, and then be connected to the fiber adapter 700. When entering the second cavity 403, the optical fibers are hold by the holding slot 4019, thereby avoiding impact of cluttered optical fibers on packaging of the optical module.

In some embodiments, as shown in FIG. 10, the first mounting shell 401 may further include a fourth side plate 4014, a fifth side plate 4015, and a second partition plate 4017. The fourth side plate 4014 is disposed opposite to the fifth side plate 4015. The second partition plate 4017 is arranged between the fourth side plate 4014 and the fifth side plate 4015. The fourth side plate 4014, the fifth side plate 4015, and the second partition plate 4017 are connected to the first side plate 4013, respectively. Moreover, the third cavity 404 is enclosed by the first side plate 4013, the fourth side plate 4014 and the second partition plate 4017, and the fourth cavity 405 is enclosed by the first side plate 4013, the fifth side plate 4015 and the second partition plate 4017.

In some embodiments, as shown in FIG. 10, the first side plate 4013 may be located at a left side of the third cavity 404. Right sides of the third cavity 404 and the fourth cavity 405 are opened in such a way that the third cavity 404 and the fourth cavity 405 similarly have U-shaped cavities with openings on the right sides. The second side plate 4011 may flush with the fourth side plate 4014, and the third side plate 4012 may flush with the fifth side plate 4015.

The third cavity 404 may include a sixth mounting surface 4041, a seventh mounting surface 4045 and an eighth mounting surface 4046. The sixth mounting surface 4041 is connected to the first side plate 4013. The eighth mounting surface 4046 may face towards the circuit board 300. The seventh mounting surface 4045 is located between the sixth mounting surface 4041 and the eighth mounting surface 4046. Moreover, the eighth mounting surface 4046 is recessed relative to the seventh mounting surface 4045.

A stopper 4042 is disposed on an end of the seventh mounting surface 4045 that connects the sixth mounting surface 4041, which separates the seventh mounting surface 4045 into a first passage 4043 and a second passage 4044. The sixth mounting surface 4041 communicates with the seventh mounting surface 4045 through the first passage 4043 and the second passage 4044.

A first light inlet 4047 and a second light inlet 4048 may be provided in the first side plate 4013, which both communicate with the third cavity 404. In other words, two paths of composite light transmitted by the fiber adapter 700 are incident into the third cavity 404 through the first light inlet 4047 and the second light inlet 4048, respectively.

In some embodiments, the first light inlet 4047 and the second light inlet 4048 may be connected to the fiber adapter 700 through MDC optical ports, such that a hard connection and assembly between the third cavity 404 and the fiber adapter 700 are obtained.

Figure 15:
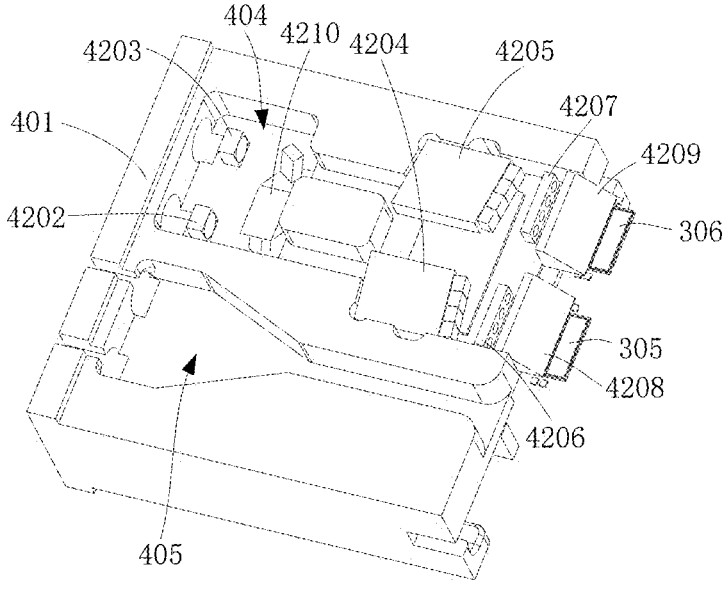
FIG. 15 is a second schematic diagram illustrating a structure of a first optical transceiver device in an optical module in accordance with an exemplary embodiment of the present disclosure.
Figure 16:
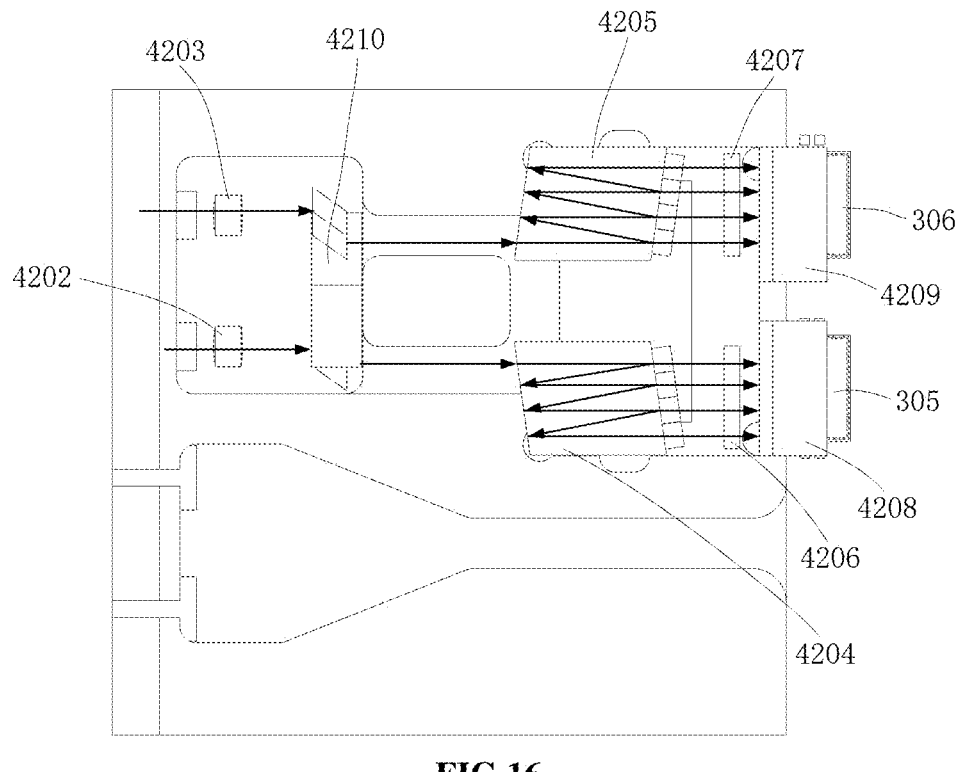
FIG. 16 is a schematic diagram illustrating an optical path in a light reception component of a first optical transceiver device in an optical module in accordance with an exemplary embodiment of the present disclosure.

FIG. 15 is a second structural schematic diagram of a first optical transceiver device in an optical module in accordance with an exemplary embodiment. FIG. 16 is a schematic diagram illustrating an optical path in a light reception component of a first optical transceiver device in an optical module in accordance with an exemplary embodiment. As shown in FIG. 15 and FIG. 16, a first collimating lens 4202 and a second collimating lens 4203 may be disposed side by side on the sixth mounting surface 4041. The first collimating lens 4202 may be aligned with the first light inlet 4047 such that one path of composite light incident through the first light inlet 4047 can be converted into a collimated light by the first collimating lens 4202. The second collimating lens 4203 may be aligned with the second light inlet 4048 such that another path of composite light incident through the second light inlet 4048 can be converted into collimated light by the second collimating lens 4203.

A first wavelength division demultiplexer 4204 and a second wavelength division demultiplexer 4205 are disposed on the seventh mounting surface 4045. The first wavelength division demultiplexer 4204 has one input and four outputs, and the input of the first wavelength division demultiplexer 4204 is disposed aligning with the first collimating lens 4202. In this way, the collimated light emitted from the first collimating lens 4202 is incident to the first wavelength division demultiplexer 4204, and the first wavelength division demultiplexer 4204 demultiplexes one path of composite light into four paths of reception light which are respectively emitted through the four outputs.

The second wavelength division demultiplexer 4205 has one input and four outputs, and the input of the second wavelength division demultiplexer 4205 is disposed corresponding to the second collimating lens 4203. In this way, the collimated light emitted from the second collimating lens 4203 is incident into the second wavelength division demultiplexer 4205. The second wavelength division demultiplexer 4205 demultiplexes one path of composite light into four paths of reception light which are respectively emitted through the four outputs.

In some embodiments, as shown in FIG. 16, the collimated light emitted from the first collimating lens 4202 is transmitted to the first wavelength division demultiplexer 4204 through the first passage 4043, and the collimated light emitted from the second collimating lens 4203 is transmitted to the second wavelength division demultiplexer 4205 through the second passage 4044. A distance between the first passage 4043 and the second passage 4044 may be smaller than that between the first collimating lens 4202 and the second collimating lens 4203. In other words, the first collimating lens 4202 is not on the same straight line as the first passage 4043, and the second collimating lens 4203 is not on the same straight line as the second passage 4044.

In order that the collimated light emitted from the first collimating lens 4202 may be transmitted to the first passage 4043, and that the collimated light emitted from the second collimating lens 4203 may be transmitted to the second passage 4044, a second prism assembly 4210 may be further provided on the sixth mounting surface 4041 between the first collimating lens 4202 and the first passage 4043. The second prism assembly 4210 is configured to change a light transmission direction such that the collimated light emitted from the first collimating lens 4202 may, after being reflected by the second prism assembly 4210, be transmitted to the first passage 4043, and the collimated light emitted from the second collimating lens 4203 may, after being reflected by the second prism assembly 4210, be transmitted to the second passage 4044.

Figure 17:
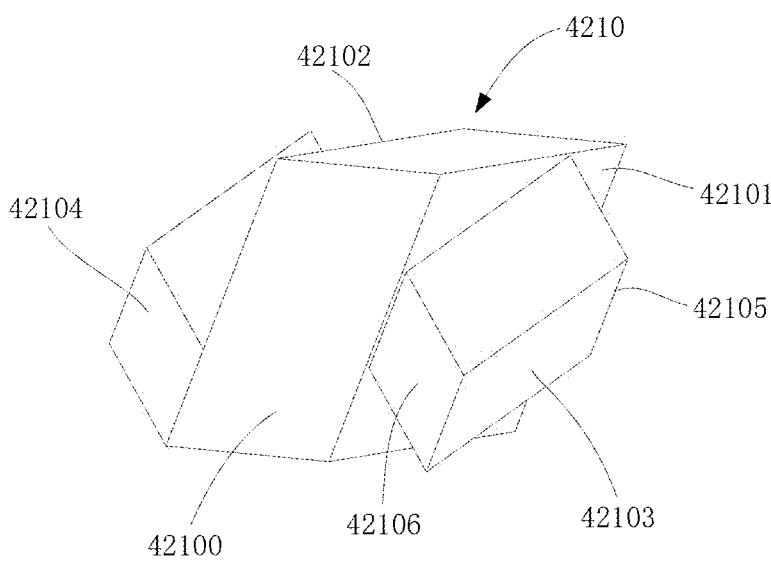
FIG. 17 is a schematic diagram illustrating a structure of a second prism assembly in an optical module in accordance with an exemplary embodiment of the present disclosure.
Figure 18:
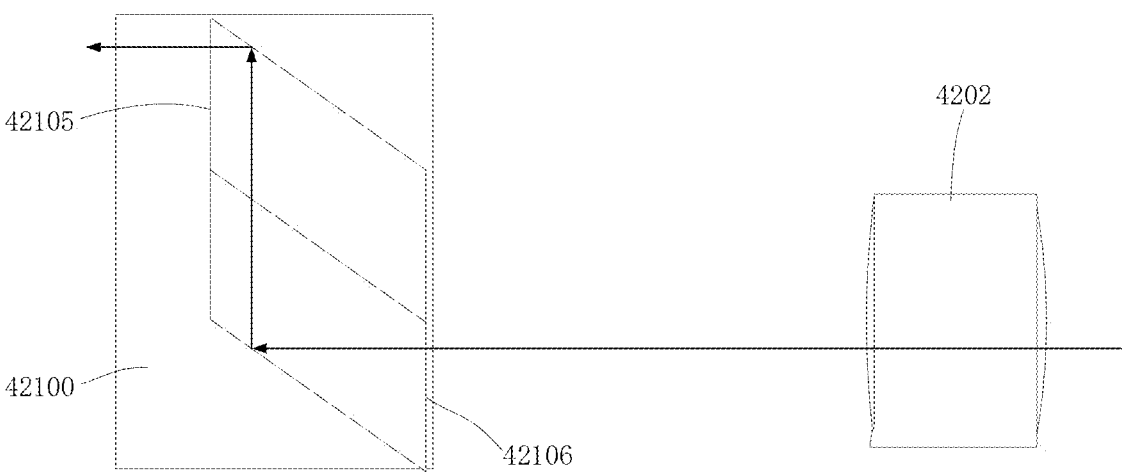
FIG. 18 is a schematic diagram illustrating an optical path in a second prism assembly in an optical module in accordance with an embodiment of the present disclosure.

FIG. 17 is a structural schematic diagram of a second prism assembly in an optical module in accordance with an exemplary embodiment. FIG. 18 is a schematic diagram illustrating an optical path in a second prism assembly in an optical module in accordance with an embodiment. As shown in FIG. 17 and FIG. 18, the second prism assembly 4210 may include a second support member 42100, a third prism 42103 and a fourth prism 42104. Opposite sides of the second support member 42100 respectively have a fifth fixing surface 42101 and a sixth fixing surface 42102. A side surface of the third prism 42103 is affixed onto the fifth fixing surface 42101, and a side surface of the fourth prism 42104 is affixed onto the sixth fixing surface 42102.

The third prism 42103 may include a second light entering surface 42106 and a second light exiting surface 42105 that are opposite to each other. There may be offset in a front-rear direction between the second light entering surface 42106 and the second light exiting surface 42105. The second light entering surface 42106 may face towards the fiber adapter 700, and the second light exiting surface 42105 may face towards the first passage 4043. In this way, the collimated light emitted from the first collimating lens 4202 is incident to the third prism 42103 through the second light entering surface 42106, and is emitted from the second light exiting surface 42105 after being reflected several times in the third prism 42103. The emission light is transmitted to the first passage 4043 (see FIG. 10).

A structure of the third prism 42103 may be the same as that of the fourth prism 42104. The collimated light emitted from the second collimating lens 4203 is incident to the fourth third prism 42104 through a light entering surface of the fourth prism 42104, and is emitted from a light exiting surface of the fourth prism 42104 after being reflected several times in the fourth prism 42104. The emission light is transmitted to the second passage 4044 (see FIG. 10).

As shown in FIG. 15, a first converging lens group 4206 and a second converging lens group 4207 may be disposed on the seventh mounting surface 4045. The first converging lens group 4206 may include four converging lenses, and each converging lens is disposed corresponding to one output of the first wavelength division demultiplexer 4204. In this way, four paths of light output from the first wavelength division demultiplexer 4204 may be converted into converged light by the first converging lens group 4206.

The second converging lens group 4207 may include four converging lenses, and each converging lens is disposed corresponding to one output of the second wavelength division demultiplexer 4205. In this way, four paths of light output from the second wavelength division demultiplexer 4205 may be converted into converged light by the second converging lens group 4207.

In some embodiments, a first detector group 305 and a second detector group 306 are disposed on the back surface of the circuit board 300. There is height difference between each of the first detector group 305 and the second detector group 306 and the eighth mounting surface 4046 of the first mounting shell 401. Moreover, reception directions of the first detector group 305 and the second detector group 306 are perpendicular to the back surface of the circuit board 300, while transmission directions of light from the first converging lens group 4206 and the second converging lens group 4207 are parallel to the back surface of the circuit board 300. Therefore, a reflector may be disposed between the first converging lens group 4206 and the first detector group 305, and a reflector may be disposed between the second converging lens group 4207 and the second detector group 306, so as to change the transmission directions of lights emitted from the first converging lens group 4206 and the second converging lens group 4207, such that these lights can be incident to the first detector group 305 and the second detector group 306.

A first reflecting prism 4208 and a second reflecting prism 4209 may be disposed on the eighth mounting surface 4046. One end of the first reflecting prism 4208 may be disposed corresponding to the first converging lens group 4206, and the other end of the first reflecting prism 4208 may be provided with a reflective surface which is located above the first detector group 305. In this way, the reflective surface of the first reflecting prism 4208 may reflect the four paths of light emitted from the first converging lens group 4206, and the four paths of light, after being reflected, are respectively incident to corresponding detectors of the first detector group 305.

One end of the second reflecting prism 4209 may be disposed corresponding to the second converging lens group 4207, and the other end of the second reflecting prism 4209 may be provided with a reflective surface which is located above the second detector group 306. In this way, the reflective surface of the second reflecting prism 4209 reflects the four paths of light emitted from the second converging lens group 4207, and the four paths of light, after being reflected, are then respectively incident to corresponding detectors of the second detector group 306.

In some embodiments, the fourth cavity 405 may include a ninth mounting surface 4051, which may be disposed opposite to the fifth mounting surface 4031. Moreover, the ninth mounting surface 4051 may extend in a direction from the first side plate 4013 towards the circuit board 300, and may be disposed side by side with the mounting surfaces in the third cavity 404. When the protrusion plate 303 of the circuit board 300 is inserted into the second cavity 403, the ninth mounting surface 4051 is located below the back surface of the circuit board 300.

As shown in FIG. 10, a third light inlet 4052 and a fourth light inlet 4053 may also be provided in the first side plate 4013, which both communicate with the fourth cavity 405.

Figure 19:
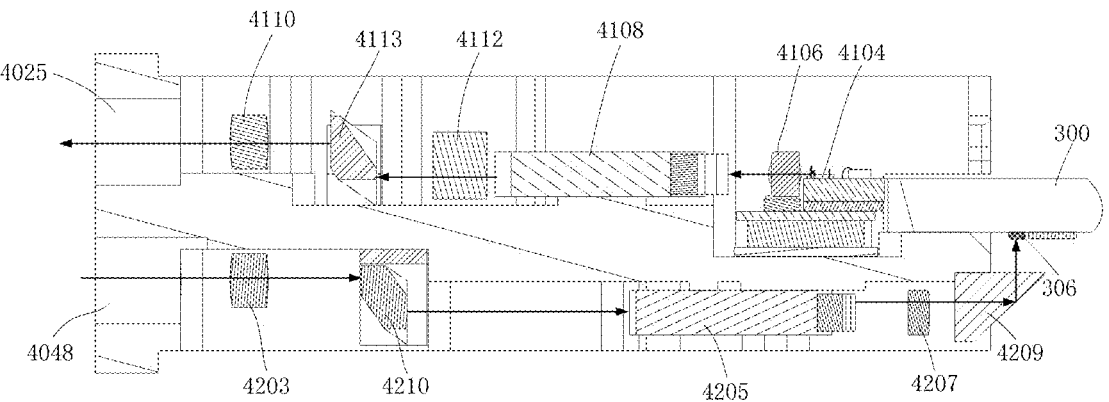
FIG. 19 is a partial assembly sectional view of a circuit board and a first optical transceiver device in an optical module in accordance with an exemplary embodiment of the present disclosure.

FIG. 19 is a partial assembly sectional view of a circuit board and a first optical transceiver device in an optical module in accordance with an exemplary embodiment of the present disclosure. As shown in FIG. 19, the first cavity 402 is stacked with the third cavity 404. After the first laser group 4103, the second laser group 4104, the first collimating lens group 4105, the second collimating lens group 4106, the first wavelength division multiplexer 4107, the second wavelength division multiplexer 4108, the first isolator 4111, the second isolator 4112, the first prism assembly 4113, the first converging lens 4109, and the second converging lens 4110 are respectively mounted into the first cavity 402, a Tx pad of the first DSP chip 310 may be connected to the first laser driver chip through a high-speed signal line. The first laser driver chip is respectively connected to the first laser group 4103 and the second laser group 4104 through signal lines, such that an electrical signal output by the first DSP chip 310 is transmitted to the first laser driver chip. The first laser driver chip outputs a driving electrical signal based on the electrical signal, to drive the first laser group 4103 and the second laser group 4104 to emit several paths of emission light.

Four paths of emission light emitted from the first laser group 4103 are converted into four paths of collimated light by the first collimating lens group 4105, and the four paths of collimated light are multiplexed into one path of composite light by the first wavelength division multiplexer 4107. This path of composite light is then converted into converged light by the first converging lens 4109, and the converged light is coupled to the fiber adapter 700 through the first light outlet 4025.

Four paths of emission light emitted from the second laser group 4104 are converted into four paths of collimated light by the second collimating lens group 4106, and the four paths of collimated light are multiplexed into one path of composite light by the second wavelength division multiplexer 4108. This path of composite light is then converted into converged light by the second converging lens 4110, and the converged light is coupled to the fiber adapter 700 through the second light outlet 4026.

After the first collimating lens 4202, the second collimating lens 4203, the first wavelength division demultiplexer 4204, the second wavelength division demultiplexer 4205, the first converging lens group 4206, the second converging lens group 4207, the first reflecting prism 4208 and the second reflecting prism 4209 are respectively mounted into the third cavity 404, two paths of composite light transmitted by the fiber adapter 700 are incident to the third cavity 404 through the first light inlet 4047 and the second light inlet 4048, respectively.

One path of the composite light incident to the third cavity 404 is converted into collimated light by the first collimating lens 4202, and the collimated light is demultiplexed into four paths of reception light by the first wavelength division demultiplexer 4204. The four paths of reception light are converted into four paths of converged light by the first converging lens group 4206, and the four paths of converged light, after being reflected by the first reflecting prism 4208, are incident to the first detector group 305.

One path of the composite light incident into the third cavity 404 is converted into collimated light by the second collimating lens 4203, and the collimated light is demultiplexed into four paths of reception light by the second wavelength division demultiplexer 4205. The four paths of reception light are converted into four paths of converged light by the second converging lens group 4207, and the four paths of converged light are incident to the second detector group 306 after being reflected by the second reflecting prism 4209.

The first detector group 305 and the second detector group 306 may be electrically connected to the Rx pad of the first DSP chip 310 through high-speed signal lines. In this way, after optical signals are converted into electrical signals by the first detector group 305 and the second detector group 306, the electrical signals may be transmitted to the first DSP chip 310 through the high-speed signal lines, and the first DSP chip 310 transmits the processed electrical signals to the host computer through the golden finger.

In some embodiments, since the detectors are disposed on the back surface of the circuit board 300, while the first DSP chip 310 is disposed on the front surface of the circuit board 300, a via hole may be provided in the circuit board 300, and the Rx pad of the first DSP chip 310 may be connected to one end of the via hole. The back surface of the circuit board 300 may be provided with a high-speed signal line, and one end of the high-speed signal line may be connected to the other end of the via hole, and the other end of the high-speed signal line may be connected to the detector, such that the detector is electrically connected to the first DSP chip 310.

In view of the above, according to the embodiments of the present disclosure, two sets of light emission components and two sets of light reception components may be integrated onto an integral structure, the light emission components and the light reception components may share one mounting shell and may be disposed back to back, with the light emission components being on an upper layer of the mounting shell, and the light reception components being on a lower layer of the mounting shell, thereby achieving transmission of 8-channel 800G emitted data and transmission of 8-channel 800G received data.

Figure 20:
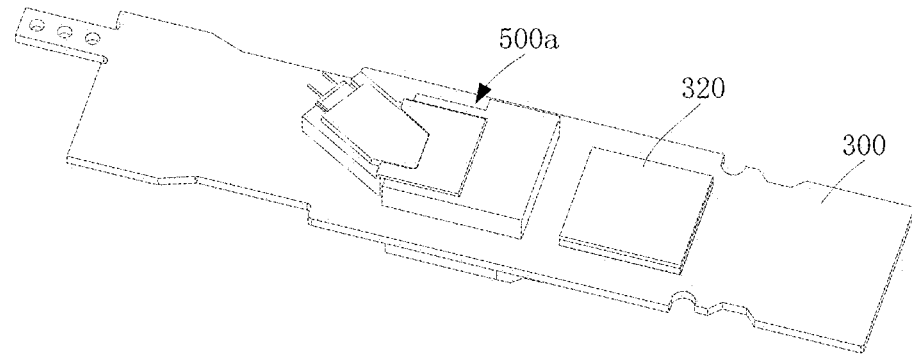
FIG. 20 is an assembly schematic diagram of a circuit board and a second optical transceiver device in an optical module in accordance with an exemplary embodiment of the present disclosure.
Figure 21:
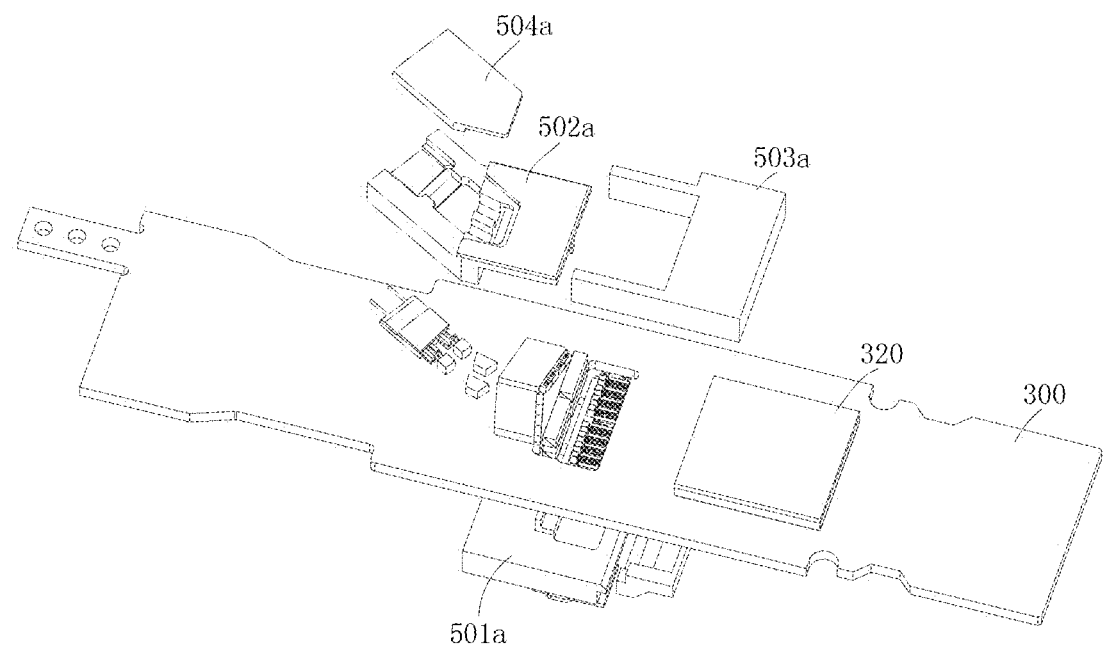
FIG. 21 is a partial exploded schematic diagram of a circuit board and a second optical transceiver device in an optical module in accordance with an exemplary embodiment of the present disclosure.

FIG. 20 is an assembly schematic diagram of a circuit board and a second optical transceiver device in an optical module in accordance with an exemplary embodiment of the present disclosure. FIG. 21 is a partial exploded schematic diagram of a circuit board and a second optical transceiver device in an optical module in accordance with an exemplary embodiment of the present disclosure. As shown in FIG. 20 and FIG. 21, the second optical transceiver device 500a may include a mounting shell (herein, for ease of description and to distinguish from the mounting shell of the first optical transceiver device described above, the mounting shell of the second optical transceiver device is referred to as a second mounting shell) 501a, a first cover member 502a, a second cover member 503a and a third cover member 504a. The second mounting shell 501a of the second optical transceiver device 500a may be disposed on the back surface of the circuit board 300, such that a laser assembly disposed on the second mounting shell 501a is located in the mounting hole 302 of the circuit board 300, and a top surface of the second mounting shell 501a is attached to the back surface of the circuit board 300.

The laser assembly may be embedded in the mounting hole 302 of the circuit board 300 via the second mounting shell 501a, and the second cover member 503a may be covered above the laser assembly, such that the laser assembly is contained within a sealed cavity formed by the second cover member 503a, the circuit board 300, and the second mounting shell 501a.

Figure 22:
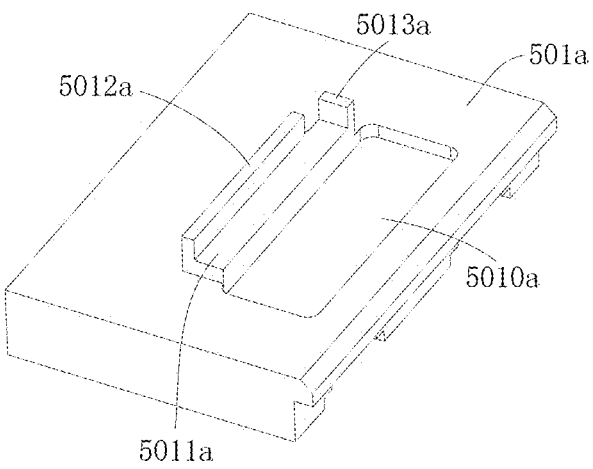
FIG. 22 is a schematic diagram illustrating a structure of a second mounting shell of a second optical transceiver device in accordance with an exemplary embodiment of the present disclosure.
Figure 23:
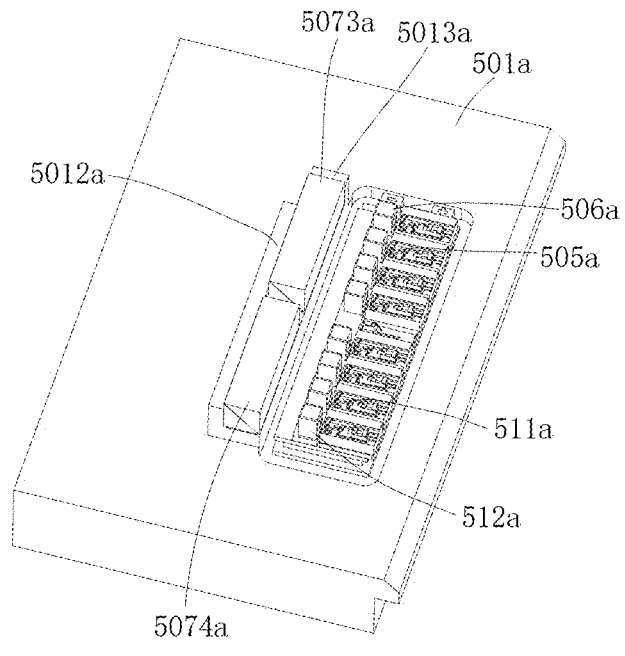
FIG. 23 is a first schematic diagram illustrating a partial structure of a second optical transceiver device in accordance with an exemplary embodiment of the present disclosure.

FIG. 22 is a structural schematic diagram of a second mounting shell of a second optical transceiver device in accordance with an exemplary embodiment. FIG. 23 is a partial structural schematic diagram of a second optical transceiver device in accordance with an exemplary embodiment. As shown in FIG. 22 and FIG. 23, a top surface of the second mounting shell 501a may be provided with a groove 5010a, which is aligned with the mounting hole 302 when the second mounting shell is mounted to the circuit board. An assembly surface of the groove 5010a is recessed relative to the top surface of the second mounting shell 501a, and a laser assembly of the second optical transceiver device 500a is disposed in the groove 5010a.

The laser assembly of the second optical transceiver device 500a may include a first laser array 505a and a second laser array 511a. As shown in FIG. 23, the first laser array 505a and the second laser array 511a may be disposed side by side in the groove 5010a in a front-rear direction. To dissipate heat generated by the first laser array 505a and the second laser array 511a, a second semiconductor cooler may be further disposed in the groove 5010a, and the first laser array 505a and the second laser array 511a may be disposed side by side on a cooling surface of the second semiconductor cooler. In this way, when the second semiconductor cooler operates, temperatures of the first laser array 505a and the second laser array 511a may be reduced. Meanwhile, the heat generated during operation of the first laser array 505a and the second laser array 511a may be transferred to the second semiconductor cooler, and then to the second mounting shell 501a for heat dissipation.

The first laser array 505a may include four lasers that are disposed side by side in the front-rear direction. The second laser array 511a may include four lasers that are disposed side by side in the front-rear direction. In this case, eight lasers may be disposed on the cooling surface of the second semiconductor cooler side by side in the front-rear direction.

The second DSP chip 320 on the front surface of the circuit board 300 is an 8-channel 800G DSP. In this way, each channel of the second DSP chip 320 can transmit an electrical signal at 100 Gb/s, which in turn can drive a laser at 100 Gb/s. In this way, each laser in the first laser array 505a and the second laser array 511a is a 100 Gb/s laser.

With support of the second semiconductor cooler and the second mounting shell 501a, wire bonding heights of the first laser array 505a and the second laser array 511a are on the same plane as the front surface of the circuit board 300. In this way, wire bonding distance from each of the first laser array 505a and the second laser array 511a to the front surface of the circuit board 300 is shortest, which thus can reduce the losses.

In some embodiments, a second laser driver chip may be further provided on the front surface of the circuit board 300 between the second DSP chip 320 and the second optical transceiver device 500a. The second DSP chip 320 may transmit an electrical signal to the second laser driver chip through a signal line, and the second laser driver chip converts the electrical signal into a driving electrical signal, which is then transmitted to the first laser array 505a and the second laser array 511a to drive the first laser array 505a and the second laser array 511a to emit four paths of emission light, respectively.

A first collimating lens array 506a and a second collimating lens array 512a may be provided on the cooling surface of the second semiconductor cooler. The first collimating lens array 506a may be located along a light exiting direction of the first laser array 505a, and the second collimating lens array 512a may be located along a light exiting direction of the second laser array 511a, in such a way that the collimating lenses and the lasers are disposed in one-to-one correspondence. Therefore, emission light emitted from each laser may be converted into collimated light by the collimating lens.

The light emission component of the second optical transceiver device 500a also includes a lens, a wavelength division multiplexer and other optical devices. The lens, the wavelength division multiplexer and other optical devices may be disposed on the first cover member 502a in such a way that they are located in a light exiting direction of the laser assembly. Several paths of light emitted from the laser assembly may be coupled to an optical fiber through the lens, the wavelength division multiplexers and the other optical devices, and then be transmitted and coupled to the fiber adapter 700 through the optical fiber.

Since wire bonding heights of lasers of the first laser array 505a and the second laser array 511a are on the same plane as the front surface of the circuit board 300, and the lens, the wavelength division multiplexer and other optical devices are disposed on the front surface of the circuit board 300, height differences exist between the wire bonding heights of the lasers and the lens, the wavelength division multiplexer and other optical devices. Therefore, a translation prism assembly may be disposed between the first collimating lens array 506a and the wavelength division multiplexer, and a translation prism assembly may be disposed between the second collimating lens array 512a and the wavelength division multiplexer, such that propagation directions of the emission lights are changed through the translation prism assemblies.

To dispose the translation prism assemblies, a boss 5011a may be disposed on the top surface of the second mounting shell 501a. The boss 5011a may be protruded from the top surface of the second mounting shell 501*a*, and is contained in the mounting hole 302 of the circuit board 300 when the second mounting shell is mounted to the circuit board. As shown in FIG. 22, a first baffle plate 5012*a* and a second baffle plate 5013*a* may be disposed on the boss 5011*a*. The first baffle plate 5012*a* may be disposed along a front-rear direction of the boss 5011*a*, and the second baffle plate 5013*a* may be disposed along a left-right direction of the boss 5011*a*. In this way, the first baffle plate 5012*a* and the second baffle plate 5013*a* are perpendicular to each other.

The translation prism assembly may include a first translation prism 5073*a* and a second translation prism 5074*a* disposed side by side on the boss 5011*a* along a front-rear direction, wherein, left sides of the first translation prism 5073*a* and the second translation prism 5074*a* abut against the first baffle plate 5012*a* such that the first translation prism 5073*a* and the second translation prism 5074*a* are limited in left-right direction by the first baffle plate 5012*a*; a front side of the first translation prism 5073*a* abuts against the second baffle plate 5013*a* such that the first translation prism 5073*a* is limited in a front-rear direction by the second baffle plate 5013*a*. In this way, the first translation prism 5073*a* and the second translation prism 5074*a* may be limited and fixed through the first baffle plate 5012*a* and the second baffle plate 5013*a*.

The first translation prism 5073*a* is located in the light exiting direction of the first laser array 505*a*. Several paths of emission light emitted from the first laser array 505*a* are converted into several paths of collimated light by the first collimating lens array 506*a*. The several paths of collimated light are transmitted along a direction parallel to the circuit board 300, and are emitted along a direction perpendicular to the circuit board 300 after being reflected by the first translation prism 5073*a*.

The second translation prism 5074*a* is located along the light exiting direction of the second laser array 511*a*. Several paths of emission light emitted from the second laser array 511*a* are converted into several paths of collimated light by the second collimating lens array 512*a*. The several paths of collimated light are transmitted along a direction parallel to the circuit board 300, and are emitted along a direction perpendicular to the circuit board 300 after being reflected by the second translation prism 5074*a*.

Figure 24:
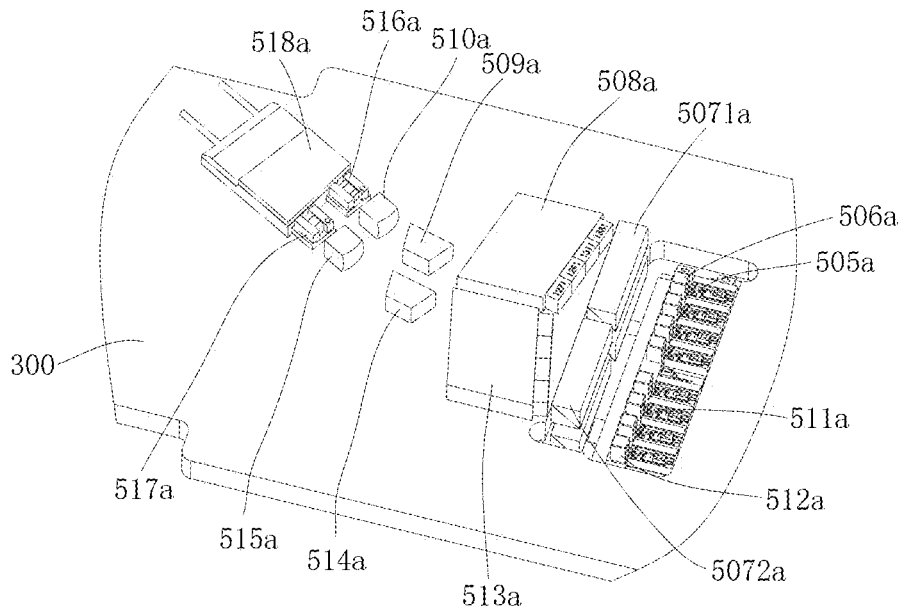
FIG. 24 is a partial assembly schematic diagram of a circuit board and a second optical transceiver device in an optical module in accordance with an exemplary embodiment of the present disclosure.

FIG. 24 is a partial assembly schematic diagram of a circuit board and a second optical transceiver device in an optical module in accordance with an exemplary embodiment. As shown in FIG. 24, the second optical transceiver device 500*a* may further include a third translation prism 5071*a* and a fourth translation prism 5072*a*. The third translation prism 5071*a* is located above the first translation prism 5073*a*, and can re-reflect the emission light reflected by the first translation prism 5073*a* such that the re-reflected emission light is transmitted in a direction parallel to the circuit board 300. The fourth translation prism 5072*a* is located above the second translation prism 5074*a*, and can re-reflect the emission light reflected by the second translation prism 5074*a* such that the re-reflected emission light is transmitted in a direction parallel to the circuit board 300.

The second optical transceiver device 500*a* may further include a third wavelength division multiplexer 508*a* and a fourth wavelength division multiplexer 513*a*. The third wavelength division multiplexer 508*a* is disposed aligned with the third translation prism 5071*a*. Several paths of emission lights reflected by the third translation prism 5071*a* are incident into the third wavelength division multiplexer 508*a* so as to output one path of composite light. The fourth wavelength division multiplexer 513*a* is disposed aligned with the fourth translation prism 5072*a*. Several paths of the emission lights reflected by the fourth translation prism 5072*a* are incident into the fourth wavelength division multiplexer 513*a* so as to output another path of composite light.

In some embodiments, since there are height differences between the third wavelength division multiplexer 508*a* and the fourth wavelength division multiplexer 513*a* and their corresponding first laser array 505*a* and the second laser array 511*a*, the first translation prism 5073*a*, the second translation prism 5074*a*, the third translation prism 5071*a*, and the fourth translation prism 5072*a* are provided, which may reflect the emission lights from the laser arrays to thereby offset the height differences between the wavelength division multiplexers and the laser arrays. The third translation prism 5071*a* may be placed on the first translation prism 5073*a* such that the third translation prism 5071*a* is supported and fixed by the first translation prism 5073*a*. The fourth translation prism 5072*a* may be placed on the second translation prism 5074*a* such that the fourth translation prism 5972*a* is supported and fixed by the second translation prism 5074*a*.

There may be a gap between the third translation prism 5071*a* and the first translation prism 5073*a*, and there may also be a gap between the fourth translation prism 5072*a* and the second translation prism 5074*a*. Therefore, height difference between the wavelength division multiplexer and the corresponding laser array may be adjusted through the gap between the third translation prism 5071*a* and the first translation prism 5073*a* and the gap between the fourth translation prism 5072*a* and the second translation prism 5074*a*.

In some embodiments, the third wavelength division multiplexer 508*a* and the fourth wavelength division multiplexer 513*a* may be directly disposed on the front surface of the circuit board 300 so as to be supported and fixed by the circuit board 300. The third wavelength division multiplexer 508*a* and the fourth wavelength division multiplexer 513*a* may also be fixedly supported via the first cover member 502*a* such that the third wavelength division multiplexer 508*a* and the fourth wavelength division multiplexer 513*a* are disposed above the front surface of the circuit board 300.

Figure 25:
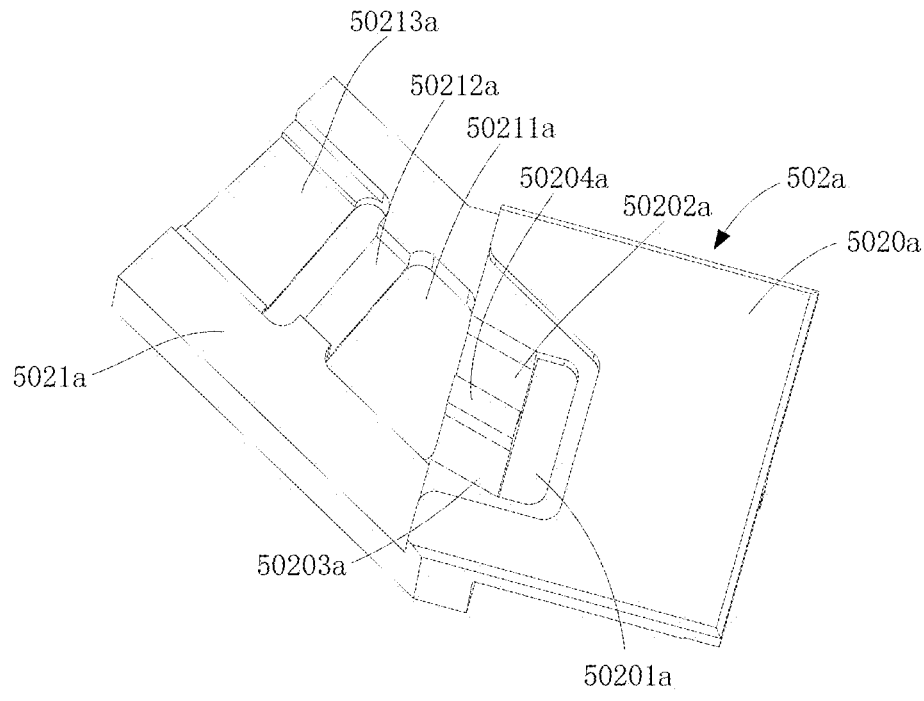
FIG. 25 is a first structural schematic diagram of a first cover member of a second optical transceiver device in accordance with an exemplary embodiment of the present disclosure.
Figure 26:
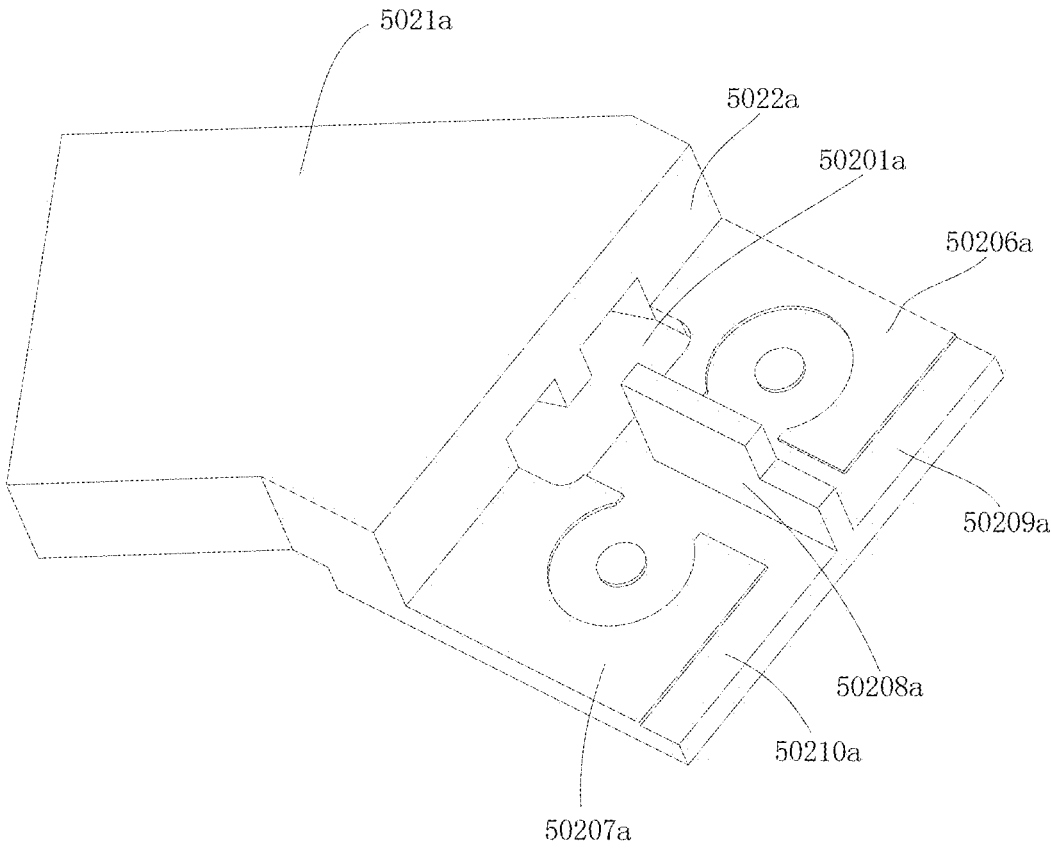
FIG. 26 is a second structural schematic diagram of a first cover member of a second optical transceiver device in accordance with an exemplary embodiment of the present disclosure.

FIG. 25 is a first structural schematic diagram of a first cover member of a second optical transceiver device in accordance with an exemplary embodiment. FIG. 26 is a second structural schematic diagram of a first cover member of a second optical transceiver device in accordance with an exemplary embodiment. As shown in FIG. 25 and FIG. 26, the first cover member 502*a* may include a first sub-cover member 5020*a* and a second sub-cover member 5021*a*. A top surface of the first sub-cover member 5020*a* is protruded relative to a top surface of the second sub-cover member 5021*a*. Moreover, in a state that the first cover member is mounted on the circuit board, a bottom surface of the second sub-cover member 5021*a* is adhered and fixed onto the front surface of the circuit board 300, while the first sub-cover member 5020*a* is located above the front surface of the circuit board 300.

A side of the first sub-cover member 5020*a* that faces towards the front surface of the circuit board 300 may be provided with a first assembly surface 50206*a* and a second assembly surface 50207*a* which may be connected to the bottom surface of the second sub-cover member 5021*a* through a first connection surface 5022*a*. As shown in FIG. 26, the first assembly surface 50206*a* and the second assembly surface 50207*a* may be disposed side by side along a front-rear direction of the first sub-cover member 5020*a*. Moreover, a third partition plate 50208*a* may be disposed between the first assembly surface 50206*a* and the second assembly surface 50207*a*, such that the first assembly surface 50206*a* is separated from the second assembly surface 50207*a* by the third partition plate 50208*a*.

As shown in FIG. 26, the side of the first sub-cover member 5020*a* that faces towards the front surface of the circuit board 300 is further provided with a third assembly surface 50209*a* and a fourth assembly surface 50210*a* which are disposed side by side along the front-rear direction of the first sub-cover member 5020*a*. Moreover, the third assembly surface 50209*a* is separated from the fourth assembly surface 50210*a* by the third partition plate 50208*a*. The third assembly surface 50209*a* and the first assembly surface 50206*a* are located at the same side of the third partition plate 50208*a*, and the fourth assembly surface 50210*a* and the second assembly surface 50207*a* are located at the same side of the third partition plate 50208*a*.

Figure 27:
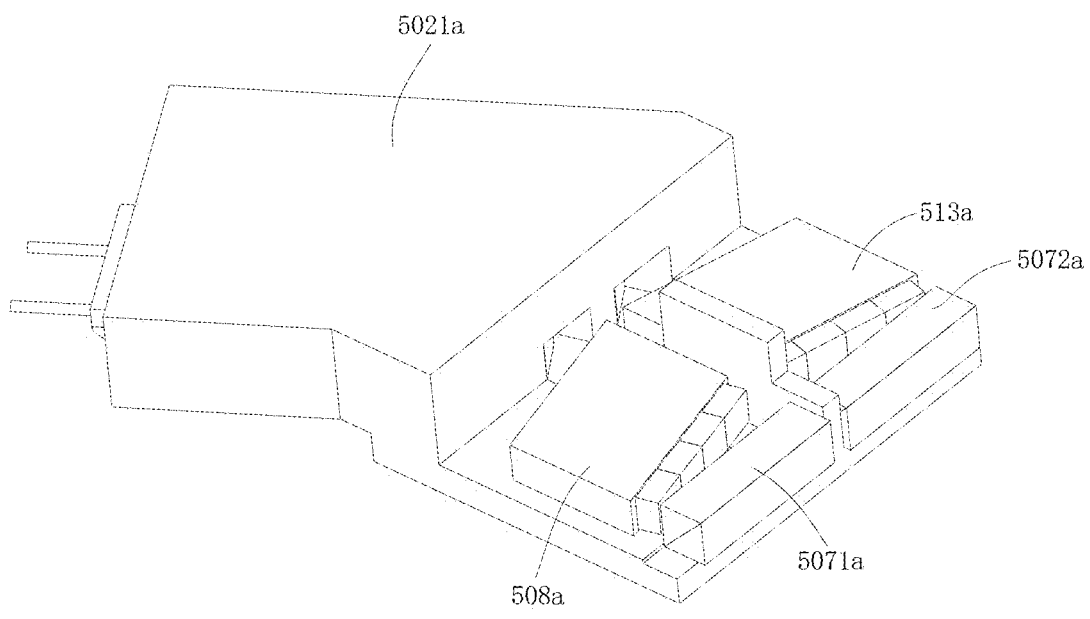
FIG. 27 is a second schematic diagram illustrating a partial structure of a second optical transceiver device in accordance with an exemplary embodiment of the present disclosure.

FIG. 27 is a second partial structural schematic diagram of a second optical transceiver device in accordance with an exemplary embodiment. As shown in FIG. 27, the third wavelength division multiplexer 508*a* may be disposed on the second assembly surface 50207*a*, the fourth wavelength division multiplexer 513*a* may be disposed on the first assembly surface 50206*a*, the third translation prism 5071*a* may be disposed on the fourth assembly surface 50210*a*, and the fourth translation prism 5072*a* may be disposed on the third assembly surface 50209*a*, in this way, the third wavelength division multiplexer 508*a*, the fourth wavelength division multiplexer 513*a*, the third translation prism 5071*a*, and the fourth translation prism 5072*a* may be fixed by the first sub-cover member 5020*a*, and the third translation prism 5071*a* can reflect the reflected light from the first translation prism 5073*a* into the third wavelength division multiplexer 508*a*, and the fourth translation prism 5072*a* can reflect the reflected light from the second translation prism 5074*a* into the fourth wavelength division multiplexer 513*a*.

In some embodiments, the second optical transceiver device 500*a* is located between the first DSP chip 310 and the second DSP chip 320, and the first DSP chip 310 is located on a left side of the second optical transceiver device 500*a*. Therefore, when the second optical transceiver device 500*a* is connected to the fiber adapter 700 through an optical fiber, the optical fiber may cross the first DSP chip 310, which may affect contact between the first DSP chip 310 and the upper shell 201, and thus reduce heat dissipation efficiency of the first DSP chip 310.

To improve the heat dissipation efficiency of the first DSP chip 310, it is generally needed to bend the optical fiber connecting the second optical transceiver device 500*a* such that the optical fiber can bypass the first DSP chip 310 to be connected to the fiber adapter 700. However, this may cause the optical fiber to be bent at a large angle, resulting in the optical fiber be easily broken. In view of this, for example, the optical emission portion of the second optical transceiver device 500*a* may be arranged obliquely, for example, such that the optical emission portion of the second optical transceiver device 500*a* is inclined to the side of the first DSP chip 310, so as to reduce a bending angle of the optical fiber.

In an exemplary embodiment of the present disclosure, the first sub-cover member 5020*a* may be disposed parallel to a length direction of the circuit board 300, and there may be a preset angle between the second sub-cover member 5021*a* and the length direction of the circuit board 300 such that an angle is formed between the first sub-cover member

Figure 28:
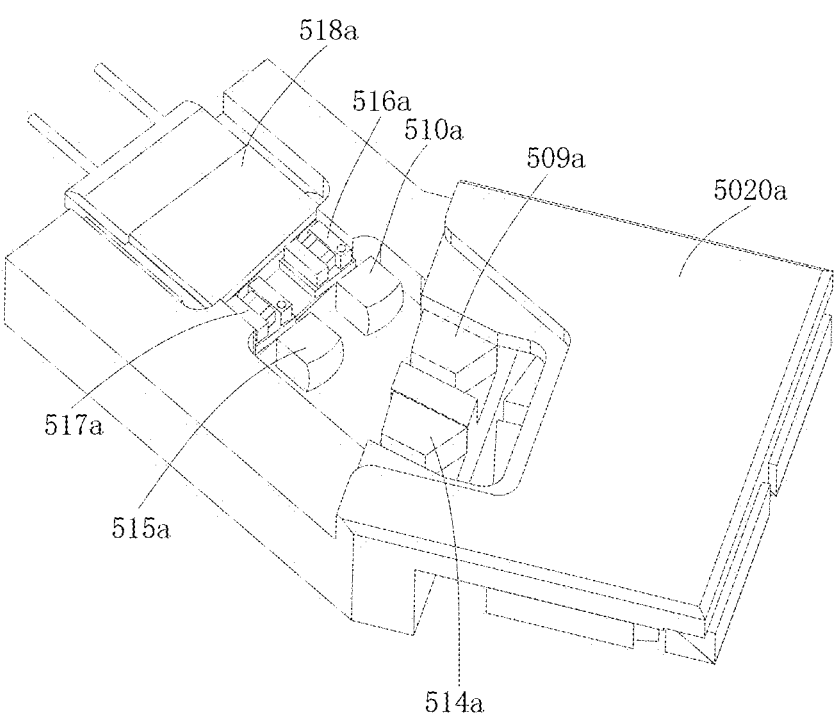
FIG. 28 is a third schematic diagram illustrating a partial structure of a second optical transceiver device in an optical module in accordance with an exemplary embodiment of the present disclosure.

5020*a* and the second sub-cover member 5021*a*, and, in a light exiting direction of composite light output from the wavelength division multiplexer on the first sub-cover member 5020*a*, the second sub-cover member 5021*a* is tilted towards left front of the circuit board 300. Therefore, a first preset angle is formed between the second sub-cover member 5021*a* and the light exiting direction of the composite light. Alternatively, as shown in FIG. 27 and FIG. 28, the first sub-cover member 5020*a* and the second sub-cover member 5021*a* may be integrally formed, with the first preset angle formed therebetween.

In some embodiments, the first preset angle between the second sub-cover member 5021*a* and the light exiting direction of the composite light may be 30°.

A side (the top surface) of the first sub-cover member 5020*a* that faces away from the front surface of the circuit board 300 may be provided a mounting recess. An assembly surface of the mounting recess is recessed relative to the front surface of the first sub-cover member 5020*a*, and a through hole 50201*a* running through the first sub-cover member 5020*a* is disposed in the mounting recess. The through hole 50201*a* penetrates from the assembly surface of the mounting recess to the first assembly surface 50206*a* and the second assembly surface 50207*a*.

The foregoing assembly surface of the mounting recess of the first sub-cover member 5020*a* may include a fifth assembly surface 50202*a* and a sixth assembly surface 50203*a*. A fourth partition plate 50204*a* may be disposed between the fifth assembly surface 50202*a* and the sixth assembly surface 50203*a* such that the fifth assembly surface 50202*a* is separated from the sixth assembly surface 50203*a* by the fourth partition plate 50204*a*.

The top surface of the second sub-cover member 5021*a* that faces away from the circuit board 300 may also be provided a mounting recess, which may include a seventh assembly surface 50211*a*, an eighth assembly surface 50212*a*, and a ninth assembly surface 50213*a*. The seventh assembly surface 50211*a* is connected to the fifth assembly surface 50202*a* and the sixth assembly surface 50203*a*. The ninth assembly surface 50213*a* faces towards the fiber adapter 700. The eighth assembly surface 50212*a* is located between the seventh assembly surface 50211*a* and the ninth assembly surface 50213*a*, and the seventh assembly surface 50211*a*, the eighth assembly surface 50212*a* and the ninth assembly surface 50213*a* are all arranged at the first preset angle with the light exiting direction of the composite light output from the wavelength division multiplexer.

FIG. 28 is a third partial structural schematic diagram of a second optical transceiver device of an optical module in accordance with an exemplary embodiment. As shown in FIG. 28, a first angle-turning prism 509*a* may be disposed on the fifth assembly surface 50202*a*. The first angle-turning prism 509*a* may be disposed corresponding to the third wavelength division multiplexer 508*a* such that the path of composite light output from the third wavelength division multiplexer 508*a*, after passing through the through hole 50201*a*, is incident to the first angle-turning prism, and then is emitted aslant towards left front of the circuit board 300 after being reflected several times by the first angle-turning prism 509*a*. A second angle-turning prism 514*a* is disposed on the sixth assembly surface 50230*a*. The second angle-turning prism 514*a* may be disposed corresponding to the fourth wavelength division multiplexer 513*a* such that another path of composite light output from the fourth wavelength division multiplexer 513*a*, after passing through the through hole 50201*a*, is incident to the second angle-turning prism, and then is emitted aslant towards the left front of the circuit board 300 after being reflected several times by the second angle-turning prism 514a.

The first angle-turning prism 509a and the second angle-turning prism 514a may have the same structure, both of which may be a dispersion prism, with a shape of isosceles trapezoid. In detail, the first angle-turning prism 509a includes an incident surface, a reflective surface, and an exit surface. Wherein, a size of the incident surface may be the same as that of the exit surface, and a size of the reflective surface may be smaller than that of a surface opposite to the reflective surface. The incident surface faces towards the third wavelength division multiplexer 508a, the exit surface faces towards the fiber adapter 700, and two ends of the reflective surface are connected to the incident surface and the exit surface, respectively.

In this way, the composite light emitted from the third wavelength division multiplexer 508a is horizontally incident to the incident surface of the first angle-turning prism 509a, is refracted to the reflective surface through the incident surface, and lastly is refracted out through the exit surface after a total reflection at the reflective surface such that an exit direction of the composite light forms the first preset angle with an incident direction of the composite light incident to the first angle-turning prism 509a.

A third converging lens 510a and a fourth converging lens 515a may be disposed on the seventh assembly surface 50211a. The third converging lens 510a is disposed aligning with the first angle-turning prism 509a, to convert the composite light emitted from the first angle-turning prism 509a into converged light. The fourth converging lens 515a is disposed aligning with the second angle-turning prism 514a, to convert the composite light emitted from the second angle-turning prism 514a into converged light.

An optical coupler 518a may be provided on the ninth assembly surface 50213a, which has two optical fibers. The third converging lens 510a converges one path of the composite light into one optical fiber in the optical coupler 518a, and the fourth converging lens 515a converges the other path of the composite light into the other optical fiber in the optical coupler 518a, such that the two paths of composite light are transmitted to the fiber adapter 700 through the two optical fibers, thereby achieving emission of several paths of light.

An optical fiber connected to the optical coupler 518a passes through the third light outlet 4032 and is connected to the fiber adapter 700, while the other optical fiber connected to the optical coupler 518a passes through the fourth light outlet 4033 and is connected to the fiber adapter 700. In this way, the optical emission portion of the second optical receiver component 500a is connected to the fiber adapter 700 by using a pigtail.

In some embodiments, when the converged light emitted from the converging lens is incident to the optical fiber in the optical coupler 518a, the converged light may be reflected at an end surface of the optical fiber due to changes in the transmission medium, and the reflected light may return to the laser along an original path, which would affect emission performance of the laser. To prevent the light reflected at the end surface of the optical fiber from returning along the original path, a third isolator 516a and a fourth isolator 517a may be disposed on the eight assembly surface 50212. The third isolator 516a is located between the third converging lens 510a and the optical coupler 518a, to isolate reflected light reflected by the optical coupler 518a in relation to one path of composite light. The fourth isolator 517a is located between the fourth converging lens 515a and the optical coupler 518a, to isolate reflected light reflected by the optical coupler 518a in relation to the other path of composite light.

In some embodiments, the third converging lens 510a, the fourth converging lens 515a, the third isolator 516a, the fourth isolator 517a and a central axis of the optical coupler 518a are all disposed at the first preset angle with a central axis of the circuit board 300.

After the first angle-turning prism 509a is disposed on the fifth assembly surface 50202a, the second angle-turning prism 514a is disposed on the sixth assembly surface 50230a, the third converging lens 510a and the fourth converging lens 515a are disposed on the seventh assembly surface 50211a, the third isolator 516a and the fourth isolator 517a are disposed on the eighth assembly surface 50212, and the optical coupler 518a is disposed on the ninth assembly surface 50213a, the third cover member 504a may be covered above the mounting recess of the second sub-cover member 5021a and the mounting recess of the first sub-cover member, so as to package the first angle-turning prism 509a, the second angle-turning prism 514a, the third converging lens 510a, the fourth converging lens 515a, the third isolator 516a, the fourth isolator 517a, and the optical coupler 518a.

Figure 29:
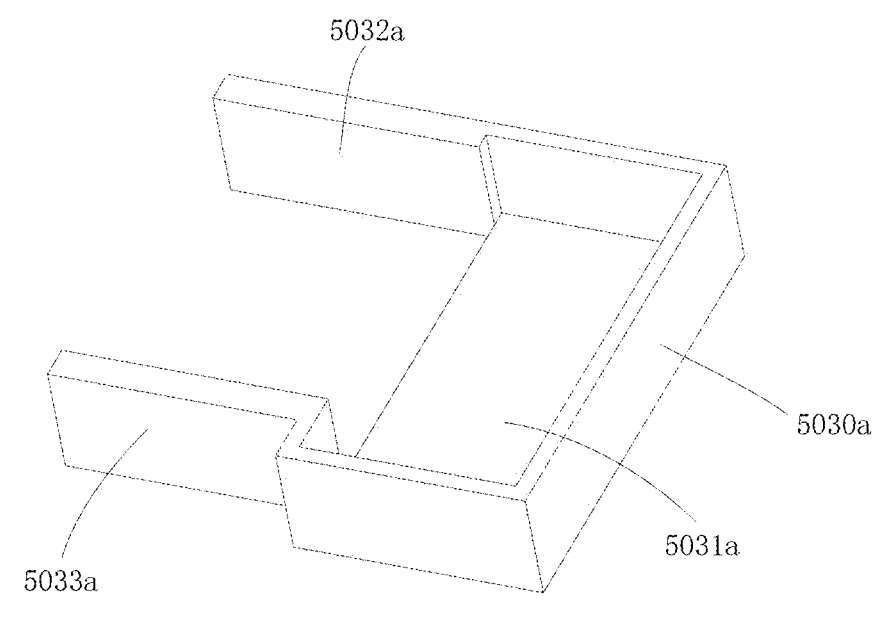
FIG. 29 is a schematic diagram illustrating a flipped structure of a second cover member of a second optical transceiver device in an optical module in accordance with an exemplary embodiment of the present disclosure.

FIG. 29 is a flipped structural schematic diagram of a second cover member of a second optical transceiver device in an optical module in accordance with some embodiments. As shown in FIG. 21 and FIG. 29, after the first cover member 502a is disposed on the front surface of the circuit board 300, and optical devices such as the wavelength division multiplexer, the angle-turning prism, the converging lens, the isolator, and the optical coupler are disposed on the first cover member 502a, the second cover member 503a may be covered above the mounting hole 302 of the circuit board 300 and connected to the first sub-cover member 5020a, so as to package the laser array, the collimating lens array, and the translation prism assembly.

In some embodiments of the present disclosure, the second cover member 503a may include a cover portion 5030a, a first protruding side plate 5032a and a second protruding side plate 5033a. A cavity 5031a may be formed in the cover portion 5030a. The first protruding side plate 5032a and the second protruding side plate 5033a are connected to the cover portion 5030a, respectively, with the first protruding side plate 5032a being disposed opposite to the second protruding side plate 5033a, and a gap being formed between the first protruding side plate 5032a and the second protruding side plate 5033a.

A bottom surface of the cover portion 5030a may be adhered onto the front surface of the circuit board 300, such that the cover portion 5030a is covered above the mounting hole 302 and the laser array and the collimating lens array are located in the cavity 5031a of the cover portion 5030a. The first sub-cover member 5020a may be located between the first protruding side plate 5032a and the second protruding side plate 5033a of the second cover member 503a, the first protruding side plate 5032a and the second protruding side plate 5033a may abut against side surfaces of the first sub-cover member 5020a, and left side surfaces of the first protruding side plate 5032a and the second protruding side plate 5033a may abut against the first sub-cover member 5022a, such that a cavity is formed by the first cover member 502a, the second cover member 503a and the circuit board 300.

Figure 30:
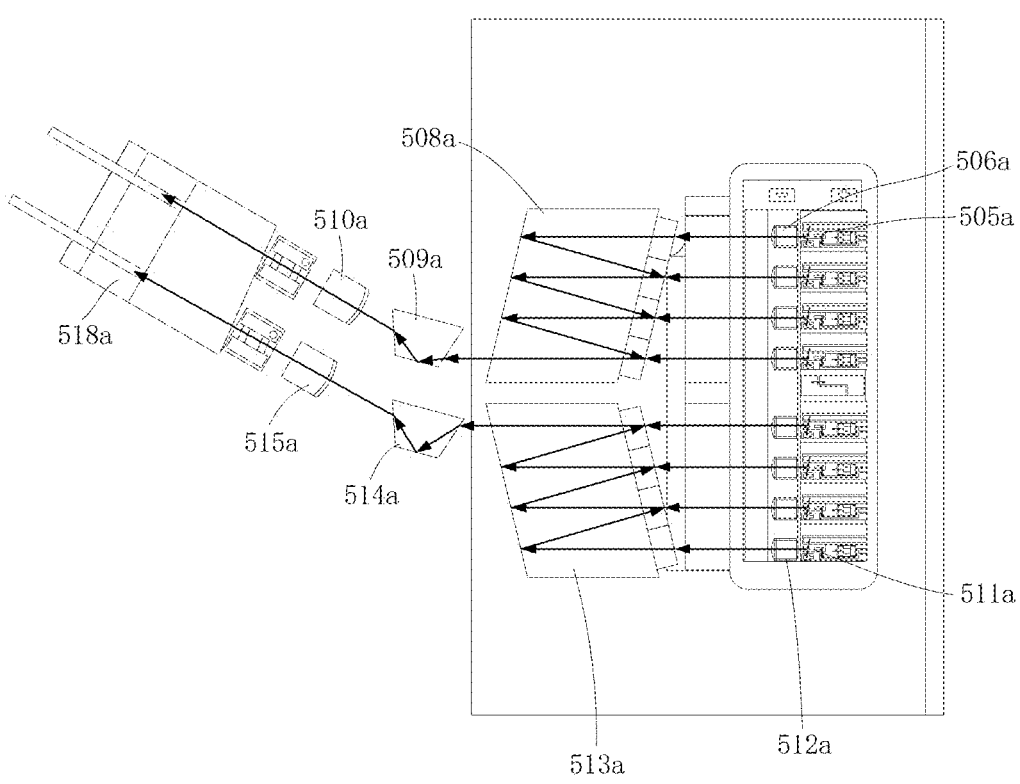
FIG. 30 is a schematic diagram illustrating an optical path in a light emission component of a second optical transceiver device in an optical module in accordance with an exemplary embodiment of the present disclosure.
Figure 31:
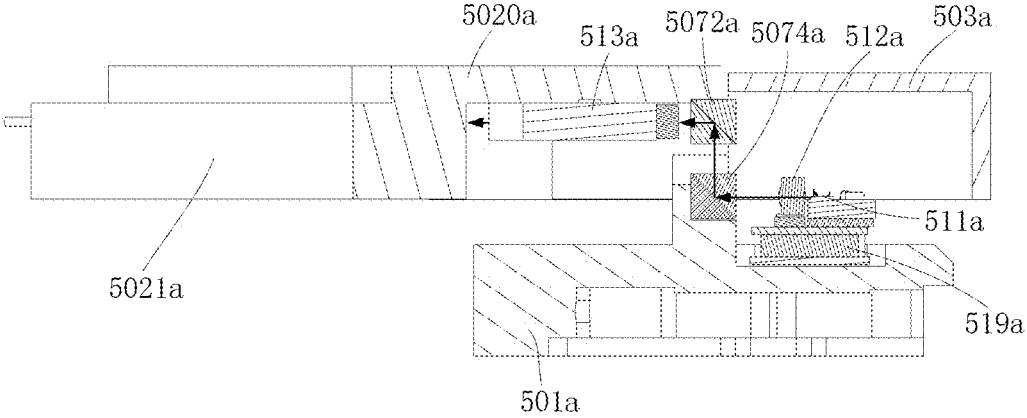
FIG. 31 is a first partial sectional view of a second optical transceiver device in an optical module in accordance with an exemplary embodiment of the present disclosure.
Figure 32:
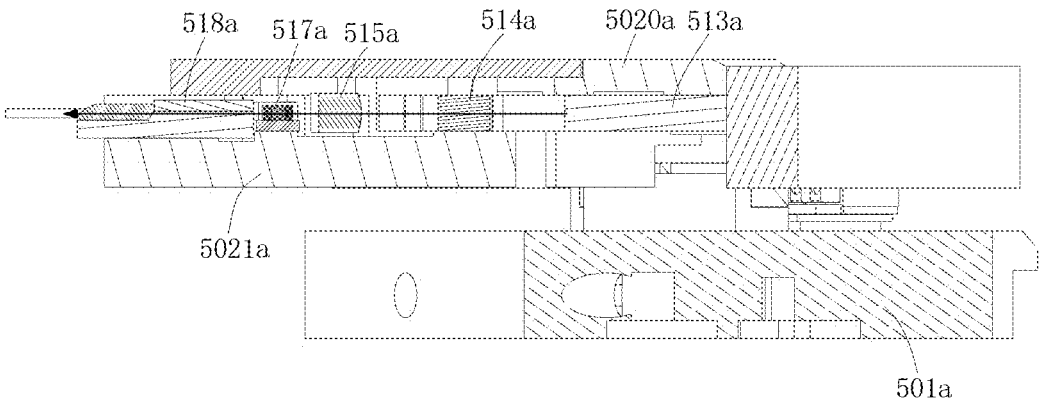
FIG. 32 is a second partial sectional view of a second optical transceiver device in an optical module in accordance with an exemplary embodiment of the present disclosure.

FIG. 30 is a schematic diagram illustrating an optical path in a light emission component of a second optical transceiver device in an optical module in accordance with an exemplary embodiment. FIG. 31 is a first partial sectional view of a second optical transceiver device of an optical module in accordance with an exemplary embodiment. FIG. 32 is a second partial sectional view of a second optical transceiver device of an optical module in accordance with an exemplary embodiment. As shown in FIG. 30, FIG. 31 and FIG. 32, the second semiconductor cooler 519*a*, the first laser array 505*a*, the second laser array 511*a*, the first collimating lens array 506*a*, and the second collimating lens array 512*a* may be disposed in the groove 5010*a* of the second mounting shell 501*a*; the first translation prism 5073*a* and the second translation prism 5074*a* may be disposed on the boss 5011*a* of the second mounting shell 501*a*; and then the top surface of the second mounting shell 501*a* may be adhered to the back surface of the circuit board 300. In this way, the first laser array 505*a*, the second laser array 511*a*, the first collimating lens array 506*a*, the second collimating lens array 512*a*, the first translation prism 5073*a* and the second translation prism 5074*a* can be located within the mounting hole 302 of the circuit board 300.

The third wavelength division multiplexer 508*a*, the fourth wavelength division multiplexer 513*a*, the third translation prism 5071*a* and the fourth translation prism 5072*a* may be disposed on the assembly surface of the first sub-cover member 5020*a* that face towards the front surface of the circuit board 300; the first angle-turning prism 509*a*, the second angle-turning prism 514*a*, the third converging lens 510*a*, the fourth converging lens 515*a*, the third isolator 516*a*, the fourth isolator 517*a* and the optical coupler 518*a* are disposed on the assembly surface of the second sub-cover member 5021*a*; then the bottom surface of the first cover member 502*a* may be adhered onto the front surface of the circuit board 300.

Subsequently, the third cover member 504*a* may be covered above the second sub-cover member 5021*a* so as to package the first angle-turning prism 509*a*, the second angle-turning prism 514*a*, the third converging lens 510*a*, the fourth converging lens 515*a*, the third isolator 516*a*, the fourth isolator 517*a* and the optical coupler 518*a*.

Subsequently, the second cover member 503*a* may be covered above the mounting hole 302 of the circuit board 300, with the first sub-cover member 5020*a* of the first cover member 502*a* being embedded in the second cover member 503*a*, thereby finishing assembling of elements of the light emission portion of the second optical transceiver device 500*a*.

After finishing assembling of the light emission component of the second optical transceiver device 500*a*, as shown in FIG. 30, four paths of emission light emitted from the first laser array 505*a* are converted into four paths of collimated light by the first collimating lens array 506*a*. The four paths of collimated light are reflected for two times by the first translation prism 5073*a* and the third translation prism 5071*a*, and then are incident to the third wavelength division multiplexer 508*a*, which multiplexes the four paths of light into one path of composite light. The composite light is refracted and reflected by the first angle-turning prism 509*a*, with a transmission direction tilted, and is further coupled to the optical coupler 518*a* through the third converging lens 510*a*, and then is transmitted to the fiber adapter 700 through an optical fiber. In this case, emission of four paths of emission light is implemented.

Another four paths of emission light emitted from the second laser array 511*a* are converted into four paths of collimated light by the second collimating lens array 512*a*. The four paths of collimated light are reflected for two times by the second translation prism 5074*a* and the fourth translation prism 5072*a*, and then are incident to the fourth wavelength division multiplexer 513*a*, which multiplexes the four paths of light into another path of composite light. This path of composite light is refracted and reflected by the second angle-turning prism 514*a*, with a transmission direction tilted, and is further coupled to the optical coupler 518*a* through the fourth converging lens 515*a*, and then is transmitted to the fiber adapter 700 through another optical fiber. In this case, emission of the other four paths of emission light is implemented.

Figure 33:
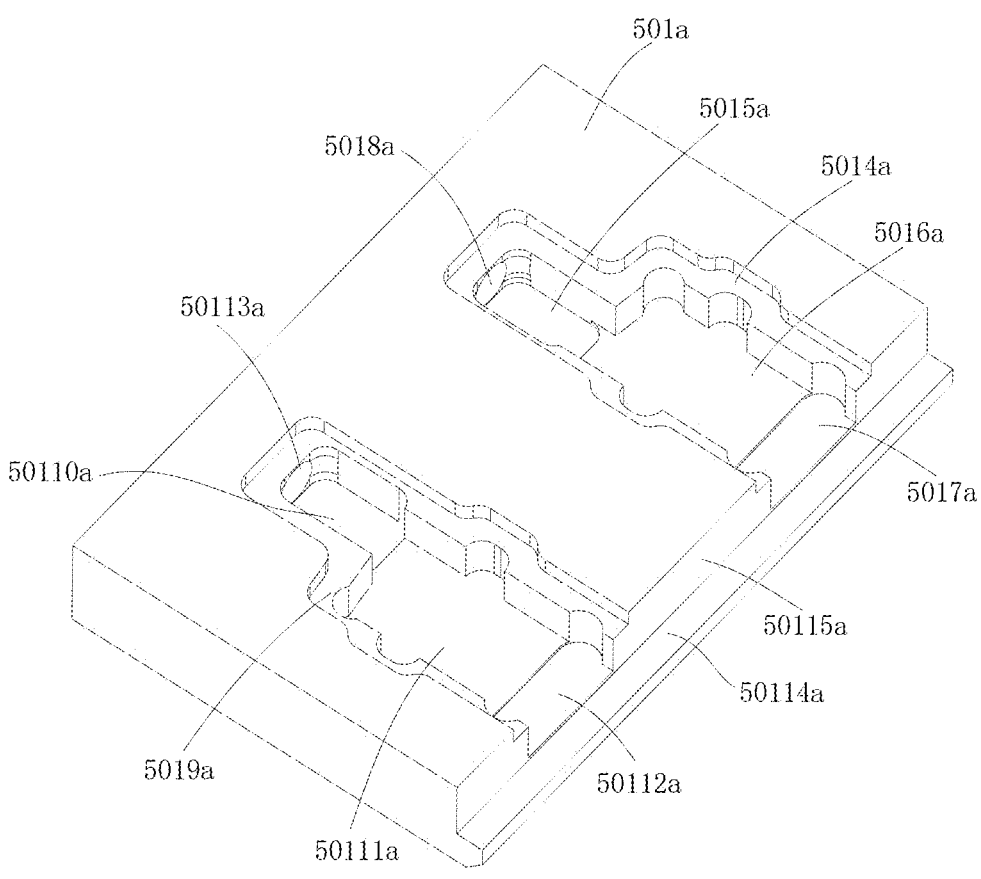
FIG. 33 is a schematic diagram illustrating a flipped structure of a second mounting shell of a second optical transceiver device in an optical module in accordance with an exemplary embodiment of the present disclosure.
Figure 34:
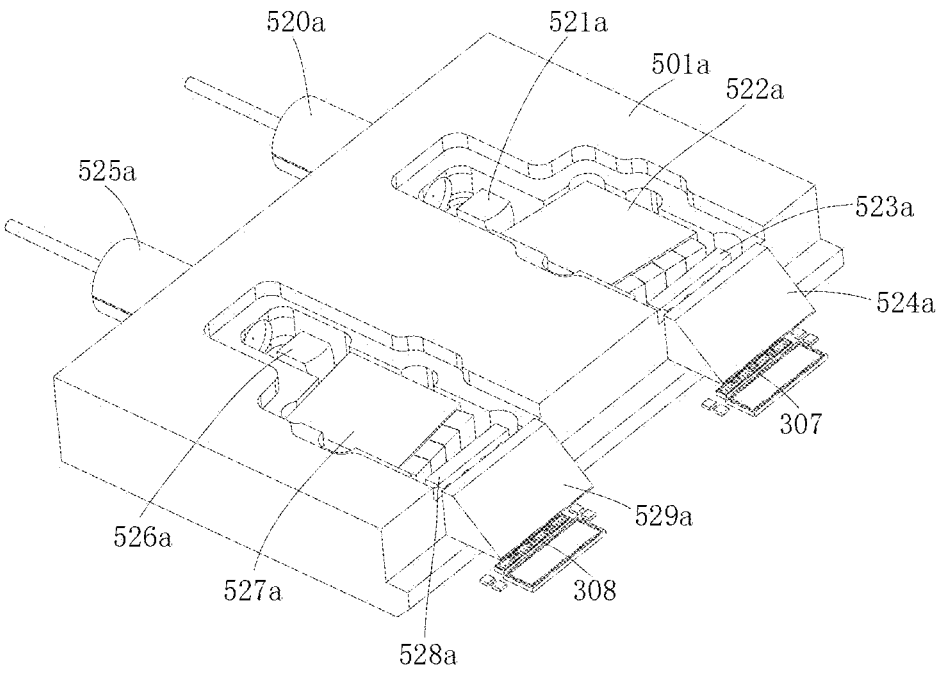
FIG. 34 is a fourth schematic diagram illustrating a partial structure of a second optical transceiver device in an optical module in accordance with an exemplary embodiment of the present disclosure.

FIG. 33 is a flipped structural schematic diagram of a second mounting shell of a second optical transceiver device in an optical module in accordance with an exemplary embodiment. FIG. 34 is a fourth partial structural schematic diagram of a second optical transceiver device of an optical module in accordance with an exemplary embodiment. As shown in FIG. 33 and FIG. 34, a first accommodation cavity, a second accommodation cavity, a first insertion hole 5018*a* and a second insertion hole 50113*a* are provided on a side (a bottom surface) of the second mounting shell 501*a* that faces away from the back surface of the circuit board 300. The first insertion hole 5018*a* communicates with the first accommodation cavity, and the second insertion hole 50113*a* communicates with the second accommodation cavity.

The first accommodation cavity may include a first support surface 5014*a*, a second support surface 5015*a*, a third support surface 5016*a*, and a fourth support surface 5017*a*. The first support surface 5014*a* is protruded relative to the second support surface 5015*a*, the third support surface 5016*a* and the fourth support surface 5017*a*. The second support surface 5015*a* is connected to the first insertion hole 5018*a*. The third support surface 5016*a* is located between the second support surface 5015*a* and the fourth support surface 5017*a*, and the fourth support surface 5017*a* is recessed relative to the third support surface 5016*a*.

A first optical coupler 520*a* for receiving external light is plugged in the first insertion hole 5018*a* such that the first optical coupler 520*a* is inserted into the first accommodation cavity through the first insertion hole 5018*a*. In some embodiments, an end of an optical fiber is connected to the first optical coupler 520*a*, and the other end passes through the third light inlet 4052 and is connected to the fiber adapter 700. In this way, external light transmitted by the fiber adapter 700 can be transmitted to the first optical coupler 520*a* through the optical fiber in the optical module.

a third collimating lens 521*a* is provided on the second support surface 5015*a*, which is configured to convert light transmitted by the first optical coupler 520*a* into collimated light. a third wavelength division demultiplexer 522*a* is provided on the third support surface 5016*a*, which is configured to demultiplex the collimated light into four paths of light. A first converging lens array 523*a* is provided on the fourth support surface 5017*a*, through which four paths of light from the third wavelength division demultiplexer are converted into four paths of converged light.

A ninth support surface 50114*a* is further provided at an end of the second mounting shell 501*a* that is connected to the fourth support surface 5017*a*. The ninth support surface 50114*a* is recessed related to the fourth support surface 5017*a* and is connected to the fourth support surface 5017*a* through a second connection surface 50115*a*.

A first detector array 307 may be disposed on the back surface of the circuit board 300, and the first converging lens array 523*a* is disposed on the fourth support surface 5017*a*. In this case, there is a height difference between the first detector array 307 and the first converging lens array 523*a*. Moreover, a reception direction of the first detector array 307 is perpendicular to the back surface of the circuit board 300, while a transmission direction of light emitted from the first converging lens array 523a is parallel to the back surface of the circuit board 300. In view of this, a third reflecting prism 524a may be disposed between the first converging lens array 523a and the first detector array 307. The third reflecting prism 524a is disposed on the ninth support surface 50114a, such that a transmission direction of light emitted from the first converging lens array 523a is changed by the third reflecting prism 524a, and the light, after being reflected by the third reflecting prism, is incident to the first detector array 307.

After the third collimating lens 521a, the third wavelength division demultiplexer 522a and the first converging lens array 523a are disposed within the first accommodation cavity, a first reception component-cover plate may be covered on the first support surface 5014a to package the third collimating lens 521a, the third wavelength division demultiplexer 522a and the first converging lens array 523a.

The second accommodation cavity may include a fifth support surface 5019a, a sixth support surface 50110a, a seventh support surface 50111a and an eighth support surface 50112a. The fifth support surface 5019a is protruded relative to the sixth support surface 50110a, the seventh support surface 50111a and the eighth support surface 50112a. The sixth support surface 50110a is connected to the second insertion hole 50113a. The seventh support surface 50111a is located between the sixth support surface 50110a and the eighth support surface 50112a, and the eighth support surface 50112a is recessed relative to the seventh support surface 50111a.

A second optical coupler 525a may be plugged in the second insertion hole 50113a such that the second optical coupler 525a is inserted into the second accommodation cavity through the second insertion hole 50113a. In some embodiments, an end of an optical fiber in the optical module may be connected to the second optical coupler 525a, and the other end may pass through the fourth light inlet 4053 and be connected to the fiber adapter 700. In this way, external light transmitted by the fiber adapter 700 may be transmitted to the second optical coupler 525a through the optical fiber in the optical module.

A fourth collimating lens 526a may be provided on the sixth support surface 50110a, which is configured to convert light transmitted by the second optical coupler 525a into collimated light. A fourth wavelength division demultiplexer 527a may be provided on the seventh support surface 50111a, which is configured to demultiplex the collimated light into four paths of light. A second converging lens array 528a is provided on the eighth support surface 50112a, through which four paths of light from the fourth wavelength division demultiplexer are converted into four paths of converged light.

A second detector array 308 may be disposed on the back surface of the circuit board 300, and the second converging lens array 528a may be disposed on the eighth support surface 50112a. In this case, there is a height difference between the second detector array 308 and the second converging lens array 528a. Moreover, a reception direction of the second detector array 308 is perpendicular to the back surface of the circuit board 300, while a transmission direction of light emitted from the second converging lens array 528a is parallel to the back surface of the circuit board 300. In view of this, a fourth reflecting prism 529a may be disposed between the second converging lens array 528a and the second detector array 308. The fourth reflecting prism 529a may be disposed on the ninth support surface 50114a such that a transmission direction of light emitted from the second converging lens array 528a is changed by the fourth reflecting prism 529a. In this case, the light, after being reflected by the fourth reflecting prism, is incident to the second detector array 308.

After the fourth collimating lens 526a, the fourth wavelength division demultiplexer 527a and the second converging lens array 528a are disposed within the second accommodation cavity, a second reception component-cover plate may be covered on the fifth support surface 5019a to package the fourth collimating lens 526a, the fourth wavelength division demultiplexer 527a and the second converging lens array 528a.

Figure 35:
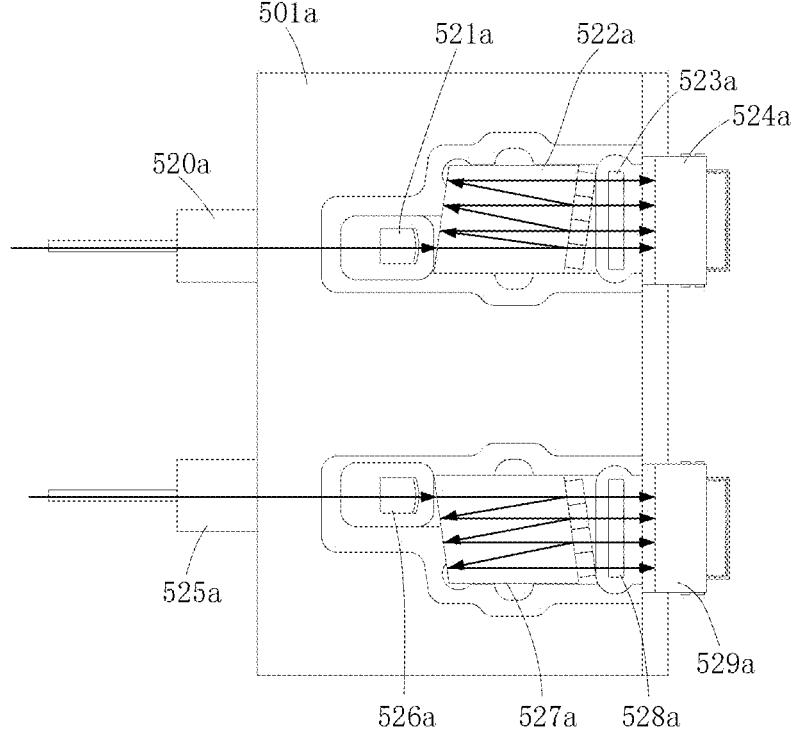
FIG. 35 is a schematic diagram illustrating an optical path in a light reception component of a second optical transceiver device in an optical module in accordance with an exemplary embodiment of the present disclosure.
Figure 36:
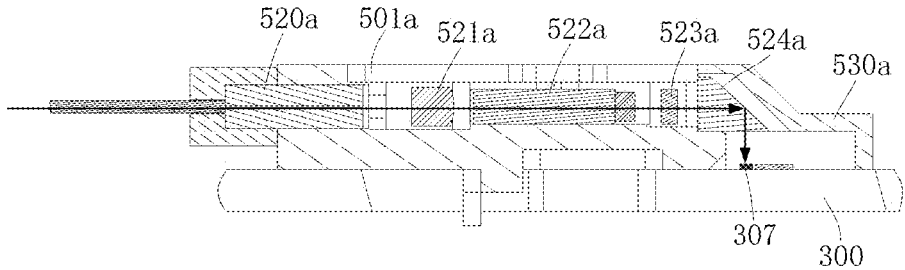
FIG. 36 is a third partial sectional view of a second optical transceiver device in an optical module in accordance with an exemplary embodiment of the present disclosure.

FIG. 35 is a schematic diagram illustrating an optical path in a light reception component of a second optical transceiver device in an optical module in accordance with an exemplary embodiment. FIG. 36 is a third partial sectional view of a second optical transceiver device of an optical module in accordance with an exemplary embodiment. As shown in FIG. 35 and FIG. 36, the first optical coupler 520a may be inserted into the first accommodation cavity of the second mounting shell 501a through the first insertion hole 5018a; the third collimating lens 521a may be disposed on the second support surface 5015a; the third wavelength division demultiplexer 522a may be disposed on the third support surface 5016a; the first converging lens array 523a may be disposed on the fourth support surface 5017a; and the third reflecting prism 524a may be disposed on the ninth support surface 50114a, with a reflective surface of the third reflecting prism 524a being located above the first detector array 307 on the back surface of the circuit board 300. Then, the first reception component-cover plate may be covered on the first support surface 5014a.

In this way, reception light transmitted by the fiber adapter 700 is transmitted through the optical fiber in the optical module to the first optical coupler 520a, and is incident to the third collimating lens 521a through the first optical coupler 520a. The third collimating lens 521a converts the reception light into collimated light, which is demultiplexed into four paths of light by the third wavelength division demultiplexer 522a. The four paths of light are converged by the first converging lens array 523a to the third reflecting prism 524a, and then are reflected to the first detector array 307 by the third reflecting prism 524a.

The second optical coupler 525a may be inserted into the second accommodation cavity of the second mounting shell 501a through the second insertion hole 50113a; the fourth collimating lens 526a may be disposed on the sixth support surface 50110a; the fourth wavelength division demultiplexer 527a may be disposed on the seventh support surface 50111a; the second converging lens array 528a may be disposed on the eighth support surface 50112a; and the fourth reflecting prism 529a may be disposed on the ninth support surface 50114a, with a reflective surface of the fourth reflecting prism 529a being located above the second detector array 308 on the back surface of the circuit board 300. Then, the second reception component-cover plate may be covered on the fifth support surface 5019a.

In this way, reception light transmitted by the fiber adapter 700 is transmitted through the internal optical fiber to the second optical coupler 525a, and is incident to the fourth collimating lens 526a through the second optical coupler 525a. The fourth collimating lens 526a converts the reception light into collimated light, which is demultiplexed into four paths of light by the fourth wavelength division demultiplexer 527a. The four paths of light are converged by the second converging lens array 528a to the fourth reflecting prism 529a, and then are reflected to the second detector array 308 by the fourth reflecting prism 529a.

In some embodiments, after the third reflecting prism 524a and the fourth reflecting prism 529a are disposed on the ninth support surface 50114a, a third reception component-cover plate 530a may be disposed above the third reflecting prism 524a and the fourth reflecting prism 529a, with a left side of the third reception component-cover plate 530a abutting against the second connection surface 50115a, and a right side adhering to the back surface of the circuit board 300. In this way, the third reflecting prism 524a, the fourth reflecting prism 529a, the first detector array 307, the second detector array 308, a trans-impedance amplifier and the like may be disposed within a cavity formed by the third reception component-cover plate 530a and the back surface of the circuit board 300.

The first detector array 307 and second detector array 308 may be electrically connected to a Rx pad of the second DSP chip 320 via high-speed signal lines. In this way, after optical signals are converted into electrical signals by the first detector array 307 and the second detector array 308, the electrical signals may be transmitted to the second DSP chip 320 through the high-speed signal lines, and the second DSP chip 320 can transmit the processed electrical signals to the host computer through the golden finger.

In some embodiments, the first detector array 307 and the second detector array 308 are disposed on the back surface of the circuit board 300, while the second DSP chip 320 is disposed on the front surface of the circuit board 300. Therefore, a via hole may be provided in the circuit board 300, and the Rx pad of the second DSP chip 320 may be connected to one end of the via hole. The back surface of the circuit board 300 may be provided with a high-speed signal line, and one end of the high-speed signal line may be connected to the other end of the via hole, and the other end of the high-speed signal line may be connected to the first detector array 307 and the second detector array 308, and thus the first detector array 307 and the second detector array 308 are electrically connected to the second DSP chip 320.

Figure 37:
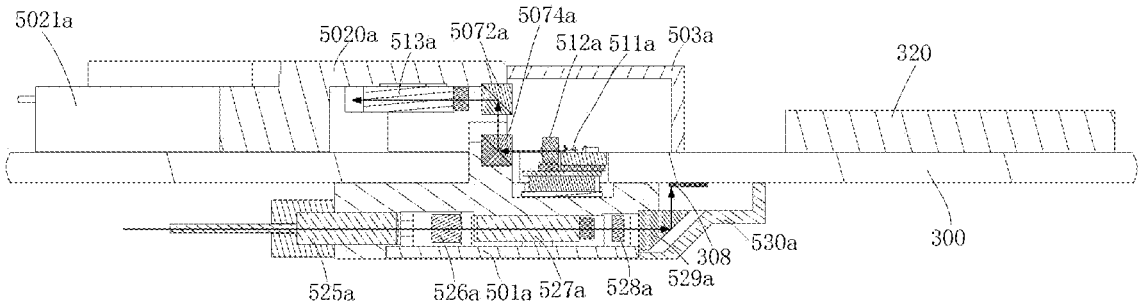
FIG. 37 is a first sectional view of a second optical transceiver device in an optical module in accordance with an exemplary embodiment of the present disclosure.
Figure 38:
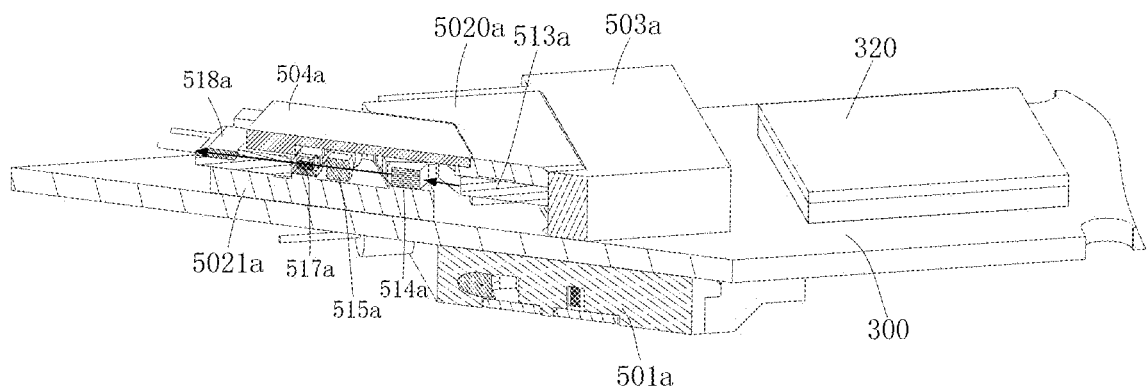
FIG. 38 is a second sectional view of a second optical transceiver device in an optical module in accordance with an exemplary embodiment of the present disclosure.

FIG. 37 is a first sectional view of a second optical transceiver device of an optical module in accordance with an exemplary embodiment. FIG. 38 is a second sectional view of a second optical transceiver device of an optical module in accordance with an exemplary embodiment. As shown in FIG. 37 and FIG. 38, according to the present disclosure, the second optical transceiver device 500a is formed by the light emission components and the light reception components in signal connections to the second DSP chip 320. The light emission components are substantially located on the front surface of the circuit board 300, with the laser assemblies of the light emission components being embedded in the mounting hole 302 of the circuit board 300, the light reception components are located on the back surface of the circuit board 300, thereby achieving 800G emitted data transmission with 8 channels and 800G received data transmission with 8 channels.

According to the embodiments of the present disclosure, the optical module includes four sets of light emission components and four sets of light reception components in total, wherein two sets of light emission components and two sets of light reception components are integrated in an integral structure, share one mounting shell, and are disposed back to back, to form the first optical transceiver device. The two sets of light emission components and the two sets of light reception components are electrically connected to the first DSP chip, and are in hard connections to and are assembled with the fiber adapter through MDC optical ports. The other two sets of light emission components and two sets of light reception components are integrated on an integral structure, share one mounting shell, and are disposed back to back, to form the second optical transceiver device. The two sets of light emission components are substantially disposed on the front surface of the circuit board, with the laser assemblies of the light emission components being embedded in the mounting hole of the circuit board, the light processing assembly including the wavelength division multiplexers and the angle-turning prisms of the light emission component are disposed obliquely such that internal optical fiber connected to the light emission component bypasses the first DSP chip and then is connected to the fiber adapter. The two sets of light reception components are disposed on the back surface of the circuit board. The light emission components and the light reception components are electrically connected to the second DSP chip, and are connected to the fiber adapter by using pigtails.

Finally, it should be noted that the foregoing embodiments are merely intended to describe the technical schemes of the present disclosure, and shall not be construed as limitation. Although the present disclosure is described in detail with reference to the foregoing embodiments, one of ordinary skills in the art may understand that modifications may be made to the technical schemes disclosed in the foregoing embodiments, or equivalents may be made to some of their technical features. However, these modifications or equivalents do not cause the nature of corresponding technical scheme to deviate from the spirit and scope of the technical schemes of various embodiments of the present disclosure.

What is claimed is:

1. An optical module, comprising:

a circuit board provided, on a front surface thereof, with a data processor and with a mounting hole; and an optical transceiver device mounted on the circuit board adjacent to the mounting hole and configured to be electrically connected to the data processor, wherein the optical transceiver device comprises:

a first cover member mounted on the front surface of the circuit board;

a mounting shell configured to be mounted, with a top surface thereof, on a back surface of the circuit board, a bottom surface of the mounting shell being provided with an accommodation cavity;

a light emission component comprising a laser assembly, a translation prism assembly and a light processing assembly, wherein the laser assembly and the translation prism assembly are located on the mounting shell and are exposed to the front surface of the circuit board through the mounting hole; emission light emitted from the laser assembly can be incident into the light processing assembly disposed on the first cover member after being reflected by the translation prism assembly; and the light processing assembly is connected to a fiber adapter via a fiber pigtail, and is configured such that a light exiting direction thereof forms a first preset angle with a light entering direction thereof within a plane parallel to the circuit board; and a light reception component that is disposed within the accommodation cavity of the mounting shell and is connected to the fiber adapter via another fiber pigtail.

2. The optical module according to claim 1, wherein the first cover member comprises a first sub-cover member and a second sub-cover member connected to each other at an angle equivalent to the first preset angle, a top surface of the first sub-cover member being protruded relative to a top surface of the second sub-cover member; and the first cover is mounted on the front surface of the circuit board in such a way that a bottom surface of the second sub-cover member is connected to the front surface of the circuit board, while the first sub-cover member extends along a length direction of the circuit board above the circuit board and is located between the second sub-cover member and the mounting hole.

3. The optical module according to claim 2, wherein the light processing assembly comprises:

a wavelength division multiplexer disposed on a bottom surface of the first sub-cover member that faces towards the front surface of the circuit board and arranged to be corresponded to the translation prism assembly so as to composite several paths of emission light leaving the translation prism assembly into a composite light;

an angle-turning prism disposed on the top surface of the first sub-cover member with a light entering surface of the angle-turning prism corresponding to a light output of the wavelength division multiplexer, the angle-turning prism being configured to reflect the composite light from the wavelength division multiplexer such that an angle formed between a light exiting direction of the angle-turning prism and a light entering direction thereof is equivalent to the first preset angle;

a converging lens disposed on the top surface of the second sub-cover member and configured to convert light from the angle-turning prism into a converged light; and an optical coupler disposed on the top surface of the second sub-cover member and configured to couple the converged light to the fiber pigtail.

4. The optical module according to claim 3, wherein the top surface of the first sub-cover member is provided with a mounting recess with a through hole running through the first sub-cover member; and the angle-turning prism is disposed in the mounting recess such that the composite light from the wavelength division multiplexer can be incident to the angle-turning prism through the through hole.

5. The optical module according to claim 2, further comprising a second cover member configured to cover above the mounting hole and to engage with the first sub-cover member so as to package the laser assembly and the translation prism assembly located within the mounting hole of the circuit board.

6. The optical module according to claim 4, wherein the converging lens and the optical coupler are disposed in a mounting recess on the top surface of the second sub-cover member; and the optical module further comprises a third cover member configured to cover above the mounting recess of the first sub-cover member and the mounting recess of the second sub-cover member so as to package the light processing assembly together with the first sub-cover member and the second sub-cover member.

7. The optical module according to claim 5, wherein the second cover member comprises a cover portion and a first protruding side plate and a second protruding side plate connected with the cover portion, respectively, wherein the cover portion is configured to cover above the mounting hole, and the first protruding side plate and the second protruding side plate are configured such that the first sub-cover member is sandwiched therebetween.

8. The optical module according to claim 2, wherein the top surface of the mounting shell is provided with a groove recessed relative to the top surface of the mounting shell and a boss protruded relative to the top surface of the mounting shell; the laser assembly is disposed in the groove such that a wire bonding height of the laser assembly is on the same plane as the front surface of the circuit board; and the translation prism assembly is disposed on the boss.

9. The optical module according to claim 8, wherein the light emission component further comprises a collimating lens array in the groove, and the collimating lens array is arranged to be aligned with the laser assembly to convert the emission light from the laser assembly into a collimated light; and the translation prism assembly comprises a first set of translation prisms and a second set of translation prisms that are stacked with each other on the boss, the first set of translation prisms being arranged to align with the collimating lens array so as to reflect light from the collimating lens array, such that a reflected light from the first set of translation prisms is incident to the second set of translation prisms, and can be incident to the light processing assembly on the first cover member after being reflected by the second set of translation prisms.

10. The optical module according to claim 9, wherein the second set of translation prisms are disposed on the bottom surface of the first sub-cover member, or are disposed on the first set of translation prisms.

11. The optical module according to claim 9, wherein the light emission component further comprises a semiconductor cooler disposed in the groove of the mounting shell; and the laser assembly and the collimating lens array are disposed on a cooling surface of the semiconductor cooler.

12. The optical module according to claim 1, wherein the optical transceiver device comprises two sets of light emission components that are disposed in the groove in the top surface of the mounting shell, wherein the laser assembly of each set of light emission component comprises 4 lasers, and the two sets of light emission components are connected to the fiber adapter through two fiber pigtails; and the data processor comprises a digital signal processing chip electrically connected to a golden finger of the circuit board and configured to drive each laser to emit light.

13. The optical module according to claim 12, wherein the light reception component comprises:

an optical coupler connected to the fiber adapter through said another fiber pigtail;

a collimating lens configured to convert light from the optical coupler into a collimated light;

a wavelength division demultiplexer configured to demultiplex the collimated light into four paths of light;

a converging lens array configured to convert the four paths of light into four paths of converged light; and a reflecting prism configured to change propagation directions of the four paths of converged light from the converging lens such that the four paths of converged light are incident to a detector array disposed on the back surface of the circuit board.

14. The optical module according to claim 13, wherein the optical transceiver device comprises two sets of light reception components; the accommodation cavity in the bottom surface of the mounting shell comprises a first accommodation cavity and a second accommodation cavity having the same structure; and the two sets of light reception components are accommodated within the first accommodation cavity and the second accommodation cavity, respectively; and the circuit board comprises two sets of detector arrays for the two sets of light reception components, and the two sets of detector arrays are electrically connected to the data processor.

15. The optical module according to claim 14, further comprising a reception component-cover plate configured to cover above the bottom surface of the mounting shell and the back surface of the circuit board, so as to package the collimating lens, the wavelength division demultiplexer, the converging lens array, the reflecting prism and the detector array in combination with the mounting shell and the circuit board.

16. An optical module, comprising:

a circuit board provided, on a front surface thereof, with a first data processor and a second data processor, and with a mounting hole between the first data processor and the second data processor;

a first optical transceiver device connected to an end of the circuit board in a plug-in manner and configured to be electrically connected to the first data processor; and a second optical transceiver device mounted on the circuit board adjacent to the mounting hole and configured to be electrically connected to the second data processor, wherein the second optical transceiver device comprises:

a first cover member mounted on the front surface of the circuit board;

a mounting shell configured to be mounted, with a top surface thereof, on a back surface of the circuit board, a bottom surface of the mounting shell being provided with an accommodation cavity;

a light emission component comprising a laser assembly, a translation prism assembly, and a light processing assembly, wherein the laser assembly and the translation prism assembly are located on the mounting shell and are exposed to the front surface of the circuit board through the mounting hole; emission light emitted from the laser assembly can be incident into the light processing assembly disposed on the first cover member after being reflected by the translation prism assembly; and the light processing assembly is connected to a fiber adapter via a fiber pigtail, and is configured such that a light exiting direction thereof forms a first preset angle with a light entering direction thereof within a plane parallel to the circuit board; and a light reception component that is disposed within the accommodation cavity of the mounting shell and is connected to the fiber adapter via another fiber pigtail.

17. The optical module according to claim 16, wherein the first cover member comprises a first sub-cover member and a second sub-cover member integrally formed, with an angle formed between the first sub-cover member and the second sub-cover member being equivalent to the first preset angle; and the first cover member is arranged on the circuit board in such a way that a bottom surface of the second sub-cover member is connected to the front surface of the circuit board, while the first sub-cover member extends along a length direction of the circuit board above the circuit board; and the top surface of the mounting shell is provided with a groove recessed relative to the top surface of the mounting shell and a boss protruded from the top surface of the mounting shell, wherein the laser assembly is disposed in the groove such that a wire bonding height of the laser assembly is on the same plane as the front surface of the circuit board, and the translation prism assembly is disposed on the boss.

18. The optical module according to claim 17, wherein the second optical transceiver device comprises two sets of light emission components disposed in the groove in the top surface of the mounting shell, and the laser assembly of each set of light emission component comprises 4 lasers;

the second optical transceiver device comprises two sets of light reception components, the accommodation cavity in the bottom surface of the mounting shell comprises a first accommodation cavity and a second accommodation cavity having the same structure, and the two sets of light reception components are accommodated in the first accommodation cavity and the second accommodation cavity, respectively; and two sets of fiber pigtails connected from the fiber adapter are connected to the two sets of light emission components and the two sets of light reception components, respectively, after passing through a mounting shell of the first optical transceiver device.

19. The optical module according to claim 18, wherein one set of fiber pigtails of the two sets of fiber pigtails passes through the mounting shell of the first optical transceiver device from a front-surface side of the circuit board and are connected to the two sets of light emission components located at the front-surface side of the circuit board; and the other set of fiber pigtails passes through the mounting shell of the first optical transceiver device from a back-surface side of the circuit board and are connected to the two sets of light reception components located at the back-surface side of the circuit board.

20. The optical module according to claim 18, wherein the mounting shell of the first optical transceiver device comprises two cavities respectively located at the front-surface side and the back-surface side of the circuit board, to allow the two sets of fiber pigtails to pass through.

\* \* \* \* \*